United States Patent [19]

Tur et al.

[11] Patent Number: 4,588,255
[45] Date of Patent: May 13, 1986

[54] OPTICAL GUIDED WAVE SIGNAL PROCESSOR FOR MATRIX-VECTOR MULTIPLICATION AND FILTERING

[75] Inventors: Moshe Tur, Palo Alto; Joseph W. Goodman, Los Altos; Herbert J. Shaw, Stanford; Behzad Moslehi, Stanford, all of Calif.; John E. Bowers, Milltown, N.J.

[73] Assignee: The Board of Trustees of the Leland Stanford Junior University, Stanford, Calif.

[21] Appl. No.: 503,871

[22] Filed: Jun. 13, 1983

Related U.S. Application Data

[63] Continuation-in-part of Ser. No. 390,664, Jun. 21, 1982, abandoned.

[51] Int. Cl.⁴ .................. G02B 6/28; G06G 7/12
[52] U.S. Cl. .................. 350/96.16; 350/96.10; 350/96.15; 364/715; 364/728; 364/822; 364/824
[58] Field of Search ............... 350/96.10, 96.13, 96.14, 350/96.15, 96.16, 96.20, 96.21; 250/227; 455/600, 601, 602, 607, 606, 608, 610, 612, 616; 364/713, 715, 724, 726, 728, 730, 800, 807, 815, 819, 821, 822, 824

[56] References Cited

U.S. PATENT DOCUMENTS

| | | | |
|---|---|---|---|
| 3,777,149 | 12/1973 | Marcatili | 350/96.16 |
| 3,944,820 | 3/1976 | Stotts | 250/227 |
| 3,973,209 | 8/1976 | Nossen | 328/14 |
| 3,993,400 | 11/1976 | Leib | 350/96.10 |
| 4,002,898 | 1/1977 | Milton | 350/96.16 |
| 4,009,938 | 3/1977 | Yamazaki et al. | 350/330 |
| 4,021,097 | 5/1977 | McMahon | 350/96.15 |
| 4,128,759 | 12/1978 | Hunt et al. | 350/96.15 |
| 4,136,929 | 1/1979 | Suzaki | 350/96.15 |
| 4,159,418 | 6/1979 | Marom | 350/96.15 |
| 4,166,212 | 8/1979 | Judeinstein | 350/96.10 |
| 4,201,942 | 5/1980 | Downer | 375/17 |
| 4,234,969 | 11/1980 | Singh | 350/96.16 |
| 4,296,319 | 10/1981 | Franks et al. | 250/227 |
| 4,342,499 | 8/1982 | Hicks, Jr. | 350/96.15 |
| 4,386,822 | 6/1983 | Bergh | 350/96.15 |
| 4,457,581 | 7/1984 | Johnson et al. | 350/96.16 |
| 4,473,271 | 9/1984 | Mitchell | 350/96.15 |
| 4,479,701 | 10/1984 | Newton et al. | 350/96.16 |
| 4,482,805 | 11/1984 | Palmer | 250/227 |
| 4,493,528 | 1/1985 | Shaw et al. | 350/96.15 |
| 4,511,207 | 7/1985 | Newton et al. | 350/96.15 |
| 4,511,208 | 4/1985 | Ozeki et al. | 350/96.16 |

FOREIGN PATENT DOCUMENTS

| | | | |
|---|---|---|---|
| 0048047 | 3/1982 | European Pat. Off. | 350/96.16 |
| 3014719 | 10/1981 | Fed. Rep. of Germany | 350/96.21 |
| 3038048 | 10/1981 | Fed. Rep. of Germany | |
| 5224539 | 8/1975 | Japan | 350/96.15 |
| 53-20348 | 2/1978 | Japan | 350/96.14 |
| 53-91752 | 8/1978 | Japan | 350/96.15 |
| 55-163505 | 12/1980 | Japan | 350/96.15 |
| 56-11432 | 4/1981 | Japan | 350/96.15 |
| 1540907 | 2/1979 | United Kingdom | 350/96.15 |

OTHER PUBLICATIONS

Bergh et al., "Single Mode Fibre Optic Directional Coupler", Electronics Letters 3/80, vol. 16, No. 7, pp. 260-261.

(List continued on next page.)

Primary Examiner—William L. Sikes
Assistant Examiner—Brian M. Healy
Attorney, Agent, or Firm—Knobbe, Martens, Olson & Bear

[57] ABSTRACT

An array (48, 49, 50, 51) of fiber optic couplers coupling an input (45) and an output (46) waveguide. The output waveguide (46) is routed among the couplers of the array such that either backward or forward coupling exists. With backward coupling, energy coupled into the output waveguide (46) in a coupler of the array is guided back to the preceding coupler for coupling back into the input waveguide (45).

The backward coupling allows recirculations to occur between couplers to create poles and zeroes in the transfer function of the array which transfer function can be programmed or tailored somewhat to have specific characteristics. Further, the backward coupling allows the array to be used for matrix-vector multiplication.

55 Claims, 29 Drawing Figures

OTHER PUBLICATIONS

Caulfield et al., "Optical Implementation of Systolic Array Processing", *Optical Comm.* vol. 40, No. 2, 12/81, pp. 86–90.

J. D. Markel and A. H. Gray, *Linear Prediction of Speech*, Springer-Verlag, New York, (1976).

Turner, J. M., "Use of the Digital Lattice Structure in Estimation and Filtering", *Signal Processing: Theories and Applications*, M. Kunt and F. De Coulon (Eds.), No.-Holland Publishing Co., New York, p. 33, (1980).

Mitra, S. K., et al., "Digital Ladder Networks", *IEEE Transactions on Audio and Electro Acoustics*, vol. AU-21, No. 1, pp. 30–36, (Feb. 1973).

Kung, H. T., et al., "Highly Concurrent Systems", In (Section 8.3), *Introduction to VLSI Systems*, C. A. Mead and L. A. Conway (Eds.), Addison-Wesley, Reading, Massachusetts, (1980).

Kung, H. T., "Why Systolic Architectures?", *Computer*, 15, pp. 37–46, (Jan., 1982).

Sheem, S. K., et al., "Single-Mode Fiber-Optical Power Divider: Encapsulated Etching Technique", *Optics Letters*, vol. 4, No. 1, pp. 29–31, (Jan. 1979).

Digonnet, M. J. F., et al., "Analysis of a Tunable Single Mode Optical Fiber Coupler", *IEEE Journal of Quantum Electronics*, vol. QE-18, No. 4, pp. 746–754, (Apr. 1982).

Redheffer, R., "On the Relation of Transmission-Line Theory to Scattering and Transfer", *Journal of Mathematics and Physics*, vol. XLI, No. 1, pp. 1–41, (Mar. 1962).

Redheffer, R., "Difference Equations and Functional Equations in Transmission-Line Theory", *Modern Mathematics for the Engineer*, E. F. Beckenbach, (Ed.), pp. 282–335, McGraw-Hill Book Co., New York, (1961).

Periasamy, N., et al., "Laser Amplification in an Optical Fiber by Evanescent Field Coupling", *Applied Physics*, vol. 24, pp. 201–203, Springer-Verlag, (1981).

Dandridge, A., et al., "Phase Noise of Single-Mode Diode Lasers in Interferometer Systems", *Applied Physics Letters*, vol. 39, No. 7, pp. 530–532, (Oct. 1, 1981).

Yamamoto, Y., et al., "Coherent Optical Fiber Transmission Systems", *IEEE Journal of Quantum Electronics*, vol. QE-17, No. 6, pp. 919–935, (Jun. 6, 1981).

Armstrong, J. A., "Theory of Interferometric Analysis of Laser Phase Noise", *Journal of the Optical Society of America*, vol. 56, No. 8, pp. 1024–1031, (Aug. 1966).

Stokes, L. F., et al., "All-Single-Mode Fiber Resonator", *Optics Letters*, vol. 7, No. 6, pp. 288–290, (Jun. 1982).

Petermann, K., et al., "Semiconductor Laser Noise in an Interferometer System", *IEEE Journal of Quantum Electronics*, vol. QE-17, No. 7, pp. 1251–1256, (Jul. 1982).

Rausch, E. O., et al., "A Fiber Optic Pulse Compression Device for High Resolution Radars", presented at the *Institute of Electrical Engineers International Conference on Radar*, pp. 326–330, (1982).

Goodman, J. W., et al., "Application of Optical Communication Technology to Optical Information Processing", *Proc. SPIE*, vol. 190, LASL Optics Conference, pp. 485–496, (1979).

Wilner, K., et al., "Fiber-Optic Delay Lines for Microwave Signal Processing", *Proc. IEEE*, vol. 64, No. 6, pp. 805–807, (May 5, 1976).

Ohlhaber, R. L., et al., "Fiber Optic Delay Lines for Pulse Coding", *Electro-Optical Systems Design*, vol. 9, pp. 33–35, (Feb. 1977).

Chang, C. T., et al., "Fibre-Optic Delay-Line Devices for R.F. Signal Processing", *Electronics Letters*, vol. 13, pp. 678–680, (Oct. 3, 1977).

Bowers, J. E., et al., "Filter Response of Single-Mode Fibre Recirculating Delay Lines", *Electronics Letters*, vol. 18, No. 3, (Feb. 4, 1982).

Jackson, K. P., et al., "Microbend Optical Fiber Tapped Delay Line", Topical Meeting on *Optical Fiber Communication*, Phoenix, Ariz., (Apr. 1982).

Casasent, D., "Acoustooptic Transducers in Iterative Optical Vector-Matrix Processors", *Applied Optics*, vol. 21, No. 10, pp. 1859–1865, (May 15, 1982).

Taylor, H. F., "Fiber and Integrated Optical Devices for Signal Processing", *SPIE*, vol. 176, Guided Wave Optical Systems and Devices II, pp. 17–27, (1979).

Marom, E., "Optical Delay Line Matched Filters", *IEEE Transactions on Circuits and Systems*, vol. CAS-25, No. 6, pp. 360–364, (Jun. 1978).

Marom, E., et al., "Encoding-Decoding Optical Fibre Network", *Electronics Letters*, vol. 14, No. 3, pp. 48–49, (Feb. 2, 1978).

Matsushita, "Directional Couplers Send TV Signals Down a Single Optical Fiber Cable", *Electronics Letters*, vol. 51, No. 9, p. 70, (Sep. 14, 1978).

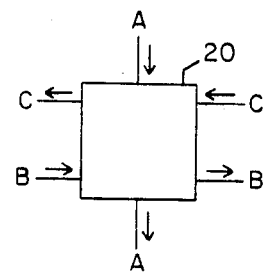
FIGURE 1
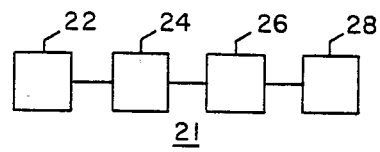
FIGURE 2
$$\begin{bmatrix} \overbrace{\begin{matrix} a_{11} & a_{12} & & & \\ a_{21} & a_{22} & a_{23} & & \\ a_{31} & a_{32} & a_{33} & a_{34} & \\ & a_{42} & a_{43} & a_{44} & a_{45} \\ & & a_{53} & & \\ & 0 & & \ddots & \end{matrix}}^{p} \Bigg\}q \quad 0 \end{bmatrix} \cdot \begin{bmatrix} x_1 \\ x_2 \\ x_3 \\ x_4 \\ \vdots \\ x \end{bmatrix} = \begin{bmatrix} y_1 \\ y_2 \\ y_3 \\ y_4 \\ \vdots \\ y \end{bmatrix}$$
A      30      32      34
FIGURE 3

$$\begin{bmatrix} a_1 & & & & & \\ a_2 & a_1 & & & & \\ a_3 & a_2 & a_1 & & O & \\ a_4 & a_3 & a_2 & a_1 & & \\ a_5 & a_4 & a_3 & a_2 & a_1 & \\ & \cdot & \cdot & \cdot & & \end{bmatrix} \begin{bmatrix} x_1 \\ x_2 \\ x_3 \\ x_4 \\ x_5 \\ \vdots \end{bmatrix} = \begin{bmatrix} b_1 \\ b_2 \\ b_3 \\ b_4 \\ b_5 \\ \vdots \end{bmatrix}$$

$\qquad\qquad$ A $\qquad\qquad$ x $\qquad$ y

FIGURE 6

$$\begin{bmatrix} a_1 & a_2 & a_3 & a_4 & & & & \\ & a_1 & a_2 & a_3 & a_4 & & O & \\ & & a_1 & a_2 & a_3 & a_4 & & \\ & & & a_1 & a_2 & a_3 & a_4 & \\ & & & & \ddots & & & \\ O & & & & & & & \end{bmatrix} \begin{bmatrix} x_1 \\ x_2 \\ x_3 \\ x_4 \\ \vdots \end{bmatrix} = \begin{bmatrix} y_1 \\ y_2 \\ y_3 \\ y_4 \\ \vdots \end{bmatrix}$$

$\qquad\qquad$ A $\qquad\qquad$ x $\qquad$ y

FIGURE 7

$$\begin{bmatrix} 1 & 1 & 1 & 1 & \\ 1 & w & w^2 & w^3 & \\ 1 & w^2 & w^4 & w^6 & \\ 1 & w^3 & w^6 & w^9 & \\ & & & & \ddots \end{bmatrix} \begin{bmatrix} x_1 \\ x_2 \\ x_3 \\ x_4 \\ x_5 \\ \vdots \end{bmatrix} = \begin{bmatrix} b_1 \\ b_2 \\ b_3 \\ b_4 \\ b_5 \\ \vdots \end{bmatrix}$$

$\qquad\qquad$ A $\qquad\qquad$ x $\qquad$ y

FIGURE 8

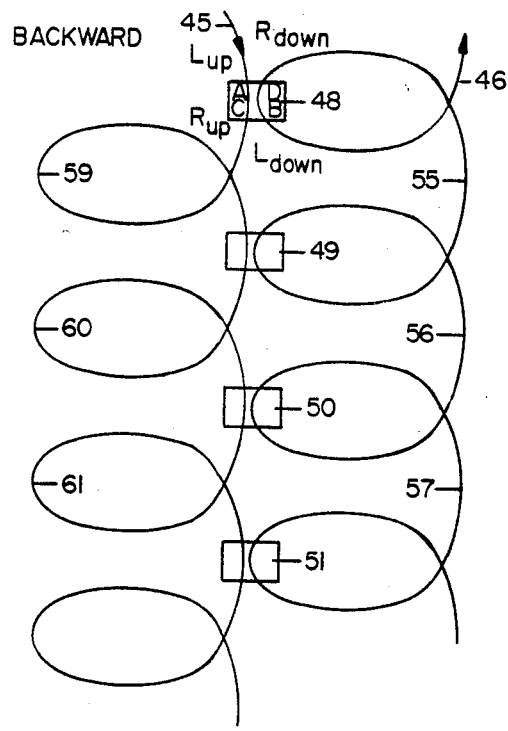
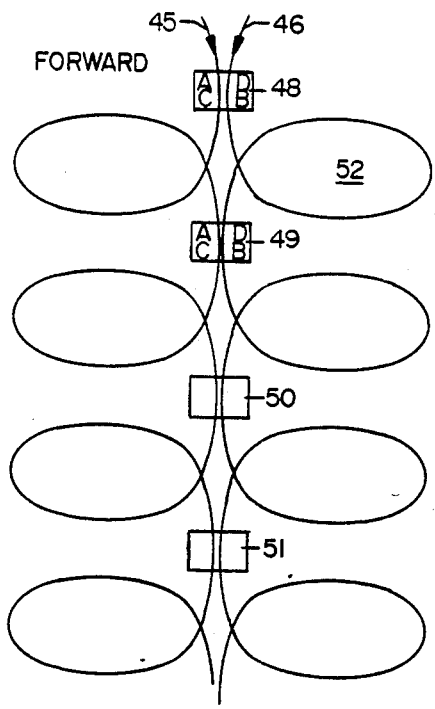
FIGURE 10
FIGURE 11
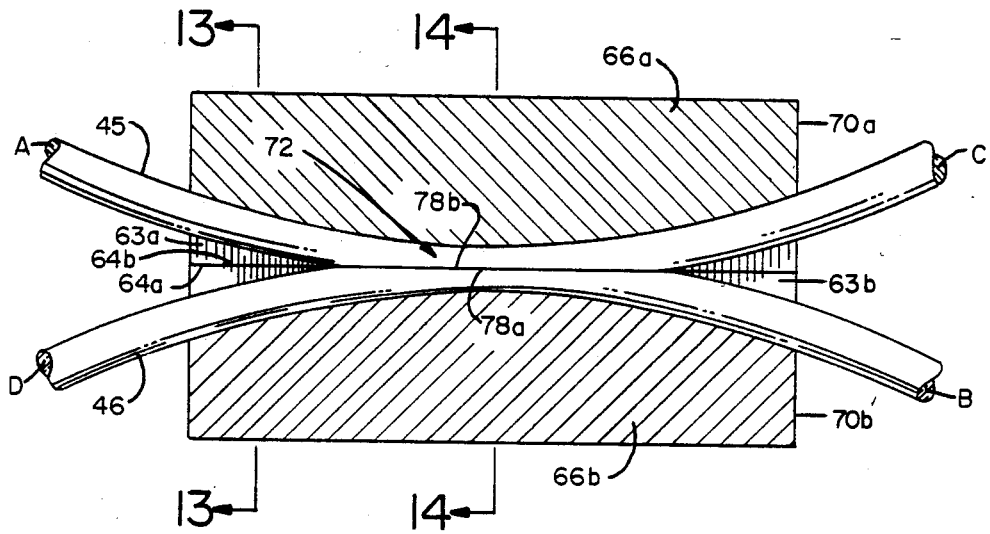
FIGURE 12

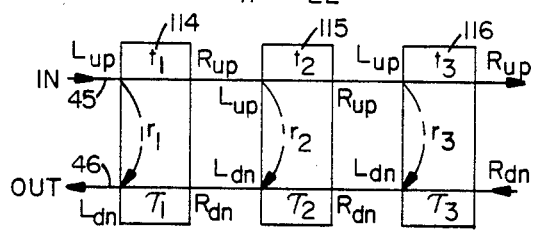
FIGURE 22
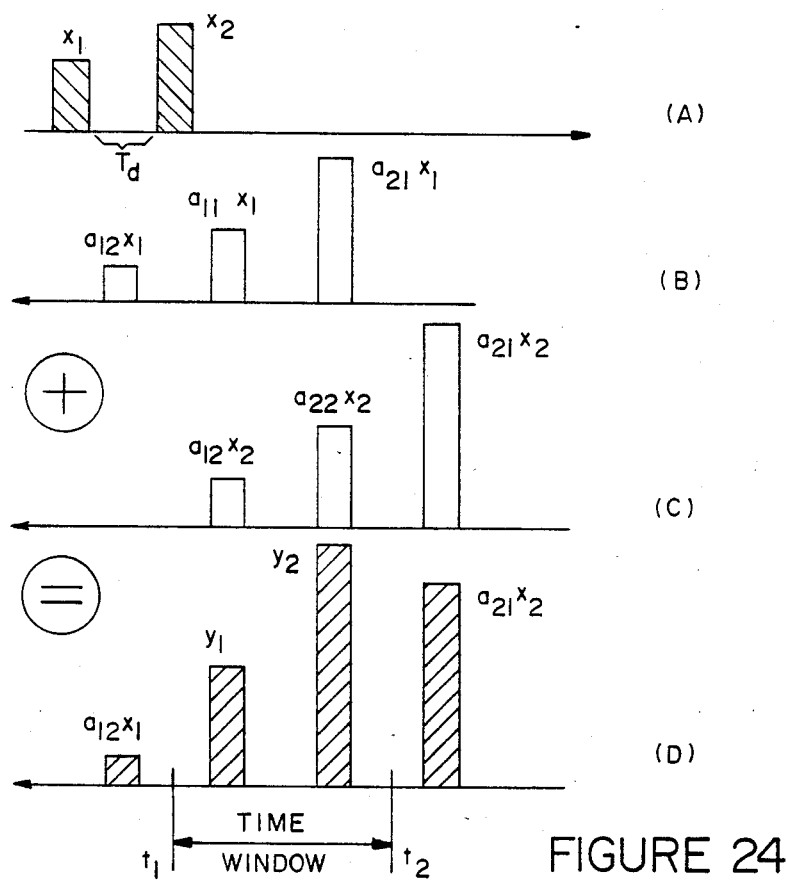
FIGURE 23
FIGURE 24

$$y_1 \begin{bmatrix} 2 \\ 1 \end{bmatrix} = \begin{bmatrix} a_{11} & a_{12} \\ 1 & 1 \\ 0 & 1 \\ a_{21} & a_{22} \end{bmatrix} \begin{bmatrix} 1 \\ 1 \end{bmatrix} \begin{matrix} x_1 \\ x_2 \end{matrix}$$
FIGURE 26
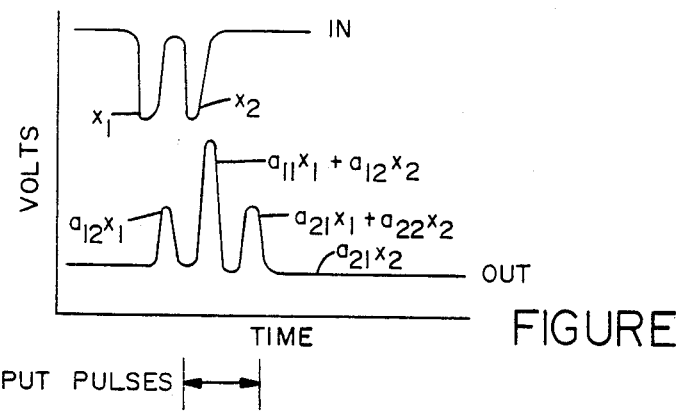
FIGURE 27
$$\begin{bmatrix} 1.5 \\ 1.5 \end{bmatrix} = \begin{bmatrix} 1 & 1 \\ 1 & 1 \end{bmatrix} \begin{bmatrix} 1 \\ 0.5 \end{bmatrix}$$
FIGURE 28
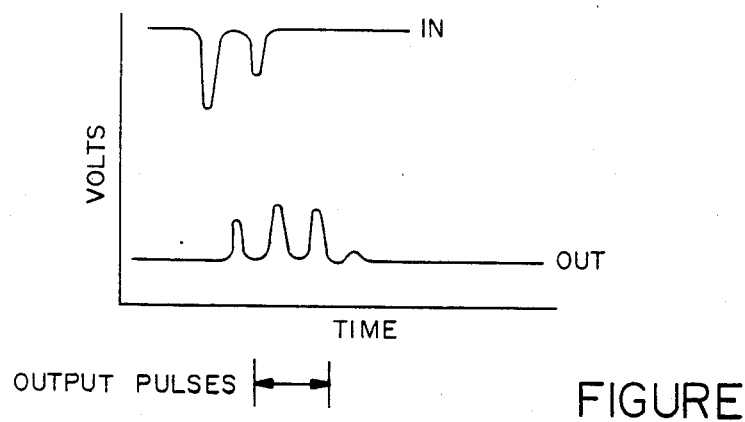
FIGURE 29

OPTICAL GUIDED WAVE SIGNAL PROCESSOR FOR MATRIX-VECTOR MULTIPLICATION AND FILTERING

RELATED APPLICATIONS

This is a continuation-in-part of a patent application entitled "Optical Guided Wave Signal Processor", Ser. No. 390,664, filed June 21, 1982, now abandoned.

BACKGROUND OF THE INVENTION

The invention relates generally to the field of optical guided wave signal processors and, more specifically, to array processors for pipeline architectures capable of matrix-vapor multiplication, lattice, transversal and matched filtering.

The need for more and more data processing speed grows with increasingly complex applications. For example, in computer systems that process images from TV cameras for robotic vision, a vast amount of information is generated which must be processed. This vast quantity of information can overwhelm an ordinary computer, leading to unacceptable processing times.

One way of speeding up such processing is through pipeline architecture for computers. Pipelining is a hardware configuration, i.e., architecture for a computer, involving a plurality of processors linked into an array to achieve higher performance. This is done by breaking up complex, time-consuming functions into a series of simpler, shorter operations, each of which can be executed in assembly line fashion with simultaneous computation on different sets of data by the different processors. The improvement in performance is directly proportional to the number of pipeline processors in the array that are simultaneously kept busy doing part of the task. Pipelining is most effective in special purpose applications which can use array processors.

The concept of systolic arrays for computing data as signals pass through system has been proposed in the prior art for network processing. Such a concept is discussed by Mead & Conway in *Introduction To VLSI Systems*, Section 8.3, Addison Wesley Publishing Company (1980). Systolic arrays have building blocks which are processors which are ganged together for matrix-vector operation. A vector is a multi-element mathematical quantity where each element represents and quantifies one characteristic of the vector; the overall set of elements completely defines the vector, e.g., V=(a, b, c) where a, b and c define V as by the cartesian coordinates of the tip of V in three dimensional space. An array is an architecture where all, or substantially all, the processors are kept active during the computation doing small pieces of it. Such arrays make multiple uses of each input data coefficient, as well as partial outputs or intermediate results. High throughput can be achieved in this fashion without requiring high bandwidth between the array and the host processor which is controlling the array processors.

Array processors are most effective in solving well defined sets of problems. Such problems include fast Fourier transforms, matrix-vector operations, and correlation or convolution operations. These processors can find effective use in computed tomography, image enhancement, image analysis, speech analysis and signal processing in general.

Signal processing often involves matrix-vector multiplication to implement the convolution and correlation mathematical operations. For example, in processing video images for robotic vision systems, it is often desirable to find the edges of objects. An image can be thought of as an array of pixels or individual data elements of varying intensity arranged in rows and columns. There is a particular mathematical operation of a convolution type which can be used to find edges in an array of pixels because convolution changes an image from a representation of light intensity variations over a scene to a representation of the rate of change of light intensities over a scene. It is therefore possible to find edges in the image since the rate of change of light intensity is usually greatest at the edges of images in the picture. The convolution operation can be carried out with a matrix-vector multiplication involving a Toeplitz matrix.

Matrix-vector multiplication implemented correlation plays an important part in many signal processing applications. For example, in communicating with satellites or whenever noise is present on communication lines, the mathematical correlation operation can be used advantageously to increase the integrity of the communication. Correlation can be physically thought of as a comparison of the pattern of the signal received to a known pattern representing command or data and finding the best match to determine what was received and when it was received. Correlation also involves a matrix-vector multiplication operation with a Toeplitz matrix.

Matrix-vector operations can be accomplished with a series of so-called inner product step operations, i.e. $C \leftarrow C + A \times B$. An inner product step processor is a device to implement the above algorithm or inner product step function.

Because of increasing quantities of information that must be processed in many applications now coming to the fore, such as speech recognition and image processing, a need for greater information processing capability has arisen. Optical signal processors which can perform matrix-vector multiplication are desirable because of the increased information carrying capability of light waves.

Various optical array processors have been described in the prior art. Among them are processors described by Caulfield et al., "Optical Implementation of Systolic Array Processors", *Optics Communications*, Vol. 40, No. 2, pages 86–90, Dec. 15, 1981; Casasent, "Acoustooptic Transducers in Iterative Optical Vector-Matrix Processors", *Applied Optics*, Vol. 21, No. 10, May 15, 1982; Taylor, "Fiber and Integrated Optical Devices for Signal Processing", SPIE Vol. 176, *Guided Wave Optical Systems and Devices*, II (1979), pages 17–27.

E. Marom in *IEEE Transactions on Circuits and Systems*, CAS-25, 360–364 (1978) described a matched filter coding method using a fiber optic structure involving two fiber optic waveguides carrying light in the same direction and cross coupled by a plurality of directional couplers. The fiber optic waveguides were multimode. This structure was said to have matched filter properties. The Marom structure differs from the structure herein because of the direction of light propagation in the output fiber which results in no feedback recirculation between couplers. Marom also used multimode fiber.

SUMMARY OF THE INVENTION

The invention described herein is an array of optical inner product step processor which can perform matrix-vector multiplication and filtering. Up to $10^9$ multiplications per second can be achieved with the invention with currently available components for matrix-vector multiplications which involve Toeplitz matrices, i.e., matrices which have the property that all entries on any line parallel to the diagonal are the same. The invention can also function as a programmable lattice filter with a transfer function having programmable locations for its poles and zeroes.

The invention is comprised of two monomode optical waveguides which are cross coupled by a plurality of fiber optic directional couplers located at various positions along the fiber. The two fibers carry light signals traveling in opposite direction through the array. Each coupler has four ports, each fiber passing through two of said ports. The couplers can be tuned to vary the coupling and transmission operators which describe the coupler in terms of the amount of power on each fiber coupled to the other fiber and the amount of power remaining in the original fiber. A coupler can be described by the operators $\tau$, r, t, $\rho$. These operators are defined in terms of the amount of light transmitted through the coupler on each fiber, and the amount of light cross coupled from each fiber to the other. The fibers between the couplers can be helically wound to implement varying delay between the couplers. The direction of the windings can be varied such that either forward or backward feedback coupling is provided. Backward coupling can provide an optical systolic array processor in the form of an inner product step processor and can act like some lattice filters.

BRIEF DESCRIPTION OF THE DRAWINGS

FIG. 1 is a symbolic diagram of an inner product step processor.

FIG. 2 is a linear array of four inner product step processors.

FIG. 3 shows a matrix-vector multiplication such as could be performed by the array of FIG. 2.

FIG. 6 shows the matrix-vector multiplication representing the convolution of the matrix A and vector x.

FIG. 7 shows the matrix-vector multiplication representing a four-tap finite impulse response filter.

FIG. 8 represents the computation to derive the discrete Fourier transform of the vector x.

FIG. 10 shows a physical embodiment of a lattice filter and matrix-vector multiplier utilizing an array of fiber couplers and two fibers so arranged as to provide feedback coupling from the output fiber back into the input fiber.

FIG. 11 shows a physical implementation of a transversal filter using an array of couplers and two optical fibers arranged to provide forward coupling.

FIG. 12 shows an embodiment of the couplers 48–51.

FIG. 22 is a matrix-vector multiplication problem which illustrates the use of fiber optic couplers to perform as inner product step processors in an array.

FIG. 23 is the array of fiber optic couplers which can be used to perform the matrix-vector multiplication of FIG. 22.

FIGS. 24(A)–(D) illustrate how the array of FIG. 23 performs the operation of FIG. 22.

FIG. 26 shows an actual matrix-vector multiplication problem that was used experimentally to verify the correct operation of the system depicted in FIG. 25.

FIG. 27 illustrates the light pulses actually observed that were input to the system of FIG. 25 and the pulses observed at the output.

FIGS. 28 and 29 illustrate another matrix-vector multiplication example and the light pulse intensities actually observed.

DETAILED DESCRIPTION OF THE PREFERRED EMBODIMENT

Figure 4:
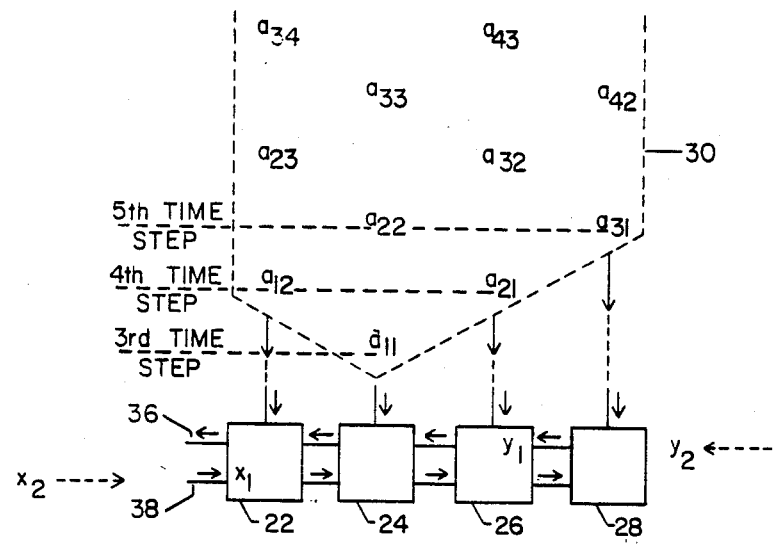
FIG. 4 shows the method of using the processor array of FIG. 2 to perform the matrix-vector multiplication of FIG. 3.

FIG. 1 shows a symbolic diagram of a basic inner product step processor 20. This processor performs the inner product step algorithm:

$$C \leftarrow C + A \times B \qquad (1)$$

where A, B and C are signals. In an electronic embodiment, the inner product step processor could be visualized as having three storage registers, each register having an input and an output connection. The basic unit of time for an array of such inner product step processors would be the time it takes one processor to perform the inner product step of Equation (1). In each unit time interval, the step processor 20: shifts the data on its input lines denoted by A, B and C into the three registers $R_A$, $R_B$ and $R_C$; computes the inner product step $R_C \leftarrow R_C + R_A \times R_B$, where the arrow indicates that the final result is stored in register C; and makes the values stored in $R_A$, $R_B$ and $R_C$ available on the output lines denoted A, B and C.

Such an inner product step processor is capable of matrix-vector multiplication when a plurality of them are connected in an array with each inner product step processor coupled to neighboring step processors. FIG. 2 shows such a processor array 21 where blocks 22, 24, 26 and 28 are all inner product step processors. A linear array such as shown in FIG. 2 is a convenient organization for matrix-vector operations.

Matrix-vector multiplication involves multiplication of the data elements of the vector by the rows of a matrix to obtain an output vector. Correlation and convolution, both fundamental operations in signal processing, each can be done by matrix-vector multiplication. FIG. 3 shows a matrix 30 and vector 32 multiplied to obtain an output vector 34. The matrix 30 is comprised of a plurality of rows, q, and columns, p, consisting of individual coefficients. These coefficients can represent the coefficients $a_{ik}$ of polynomial elements, pixel intensities or any one of a number of other possibilities. The input vector 32 has the data elements $(x_1, x_2 \ldots x_n)$ at the time t, while the output vector 34 has the elements $(y_1, y_2 \ldots y_n)$ at the time t. The matrix-vector product can be computed by the following iterations:

$$y_i^{(1)} = 0 \qquad (2)$$

$$y_i^{(k+1)} = y_i^{(k)} + a_{ik} x_k \qquad (3)$$

where Equation (2) means that the elements of the output vector at time 1 are initially 0's, and Equation (3) indicates the inner product step operations that are performed in the processor array to determine the subelements of the elements of the output vector. Each $y_i^{(K+1)}$ becomes the input signal for the next processor in the array as becomes clear during the discussion of FIGS. 4 and 5.

In FIG. 3, the matrix 30 is an n×n band matrix having a band width of $w = p + q - 1$, but the below described method of performing the matrix-vector multiplication will work equally well with an n×n dense matrix where none of the coefficients are zero. The matrix-vector multiplication represented by FIG. 3 can be physically implemented by pipelining the elements $x_i$ and $y_i$ of the vectors x and y through w linearly connected processors such as the array shown in FIG. 2.

FIG. 4 shows the method of using the linear array of processors of FIG. 2 to perform a matrix-vector multiplication such as is shown in FIG. 3. The general scheme of FIG. 4 is to move the elements of the vector y, which are initially zero, to the left on an output line 36 while the elements of the vector x are moving to the right on an input line 38 and the coefficients $a_{ik}$ on the diagonals and offdiagonals in a staggered order of the matrix 30 are moving down into the processors 22, 24, 26 and 28. All moves are synchronized. Each element $y_i$ of the output vector y is able to accumulate all of its subterms before it leaves the network. That is, each element $y_i$ of the output vector y is the summation of the product of each coefficient in the corresponding row i times the corresponding element in the input vector x such that each element $y_i$ equals the summation of all subelements $s_i$ with a corresponding coefficient of the row $_i$. For example, in FIG. 3, $y_1 = a_{11}x_1 + a_{12}x_2$ and $y_2 = a_{21}x_1 + a_{22}x_2 + a_{23}x_3$.

Figure 5:
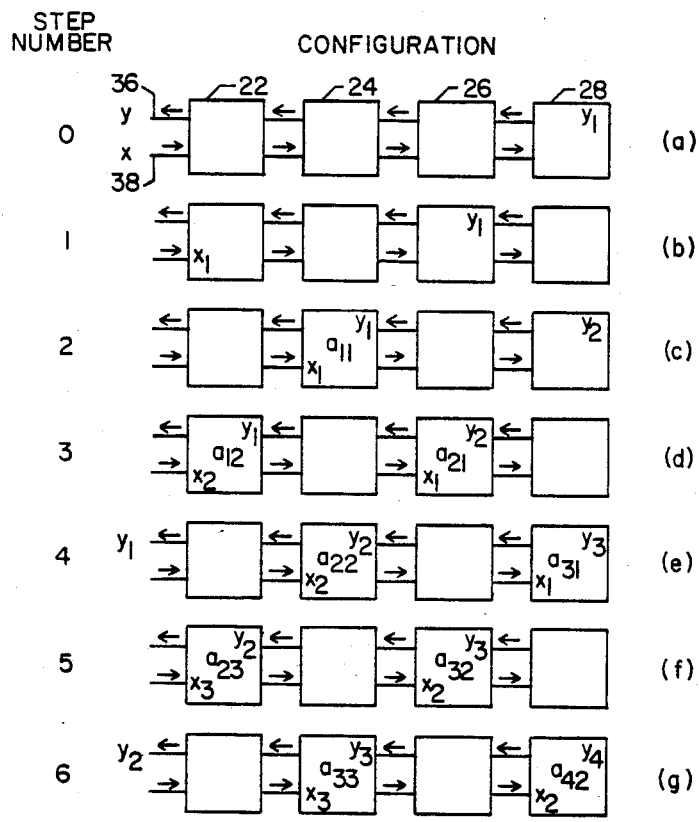
FIG. 5 shows the configuration of the array and input and output vector element positions in each step of the matrix-vector multiplication algorithm embodied by the array of inner product step processors.

A better understanding of FIG. 4 may be obtained by referring to FIG. 5 in conjunction with FIG. 4. FIG. 5 shows the configuration of the processor array and positions of the elements of the input and output vectors in the array during each step of the matrix-vector multiplication algorithm shown in FIG. 4 embodied by the array of inner product step processors 22, 24, 26 and 28. The array of inner product step processors receive the elements $x_i$ of the input vector x on the line 38 and the elements of the output vector y leave on the line 36. Initially, all registers in the processors 22, 24, 26 and 28 contain zeroes. For convenience, the register or storage element containing the y vector element will be symbolized by the space in the top part of each processor while the register containing the x vector element will be symbolized by the lower space in the processor. The register or storage device containing the coefficient from the matrix 30 is symbolized by the middle section of the box representing each processor.

The time steps of the algorithm are shown in FIGS. 5(a)–5(g). In FIG. 5(a) representing time step 1, element y, is fed into processor 28. In FIG. 5(b) or time step 2 element x, is fed into processor 22 while element y, is moved left one place into the processor 26. In each following time step elements $x_1$ and $y_1$ continue to move right and left respectively. FIG. 5(c) or time step 3 shows the coefficient $a_{11}$, from the matrix 30, entering the processor 42 where $y_1$ is updated so that:

$$y_1 = y_1 + a_{11} x_1 \qquad (4)$$

where $y_1$ is the $y_1$ on the line 36 arriving from the processor 26. Thus:

$$y_1 = a_{11} x_1 \qquad (5)$$

after the third time step.

In the fourth time step shown in FIG. 5(d), the coefficients $a_{12}$ and $a_{21}$ enter the processors 22 and 26 respectively while the $x_2$ input vector element enters the processor 22 and the $y_2$ output element enters the processor 26 having entered the processor 28 during the third time step. In the processor 26 the inner product step is performed so that:

$$y_1 = y_1 + a_{12} x_2 \qquad (6)$$

But $y_1 = a_{11} x_1$ from Equation (5) by the action of the processor 42 in time step 3. So $y_1$ becomes:

$$y_1 = a_{11} x_1 + a_{12} x_2 \qquad (7)$$

just before it leaves the processor 22 in the next, i.e., or fifth time step. Note that Equation (7) is the complete expression for the element $y_1$ in the matrix-vector multiplication of FIG. 3.

Meanwhile, also during fourth time step, the first subcomponent or term of $y_2$ is being generated in the processor 26 as:

$$y_2 = a_{21} x_1 \qquad (8)$$

During the fifth time step shown in FIG. 5(e), $y_1$ is output, and $x_2$ and $y_2$ enter the processor 24 as does the coefficient $a_{22}$. The inner product step performed by the processor 24 makes:

$$y_2 = a_{21} x_1 + a_{22} x_2. \qquad (9)$$

Also during the fifth time step, $y_3$ enters the processor 28 as does the coefficient $a_{31}$ and the input signal $x_1$ so that $y_3$ becomes:

$$y_3 = a_{31} x_1 \qquad (10)$$

During the sixth time step, shown in FIG. 5(f), $y_2$ becomes:

$$y_2 = a_{21} x_1 + a_{22} x_2 + a_{23} x_3 \qquad (11)$$

and $y_3$ becomes:

$$y_3 = a_{31}x_1 + a_{32}x_2. \quad (12)$$

During the seventh time step, shown in FIG. 5(g), $y_2$ is output and $y_3$, by the action of the processor 24, becomes:

$$y_3 = a_{31}x_1 + a_{32}x_2 + a_{33}x_3. \quad (13)$$

and $y_4$, $x_2$ and $a_{42}$ enter the processor 28 such that $y_4$ becomes:

$$y_4 = a_{42}x_2. \quad (14)$$

The algorithm continues in this manner until the matrix-vector multiplication is complete.

In essence then, the matrix-vector multiplication illustrated in FIGS. 3–5 involves introducing, at different times, the coefficient on each diagonal of the matrix 30 into one of the processors in the array such that each processor has its multiplication coefficient established as the matrix coefficients on one of the diagonals in the matrix 30. The coefficients in the diagonals are arranged into columns in FIG. 4 and the elements in the columns are staggered so that as the columns "move" down vertically into the processors, the coefficients arrive in the processors at the proper time, i.e., $a_{11}$ arrives in the processor 24 during the third time step, while $a_{12}$ and $a_{21}$ arrive in the processors 22 and 26 respectively during the fourth time step.

The applicant has realized that a fiber optic directional coupler can be used for the processors 22, 24, 26 and 28 where the matrix coefficients establish the coupling between the optical fibers passing through the coupler and the summation occurs optically on the output fiber where the timing of coupling new terms matches the arrival of previously generated terms generated in other couplers.

The elements of the input vector can be introduced into these couplers on one of the waveguides as light signals with characteristics such as intensity which represent the magnitude of the elements of the input vector. In two fiber embodiments, the input vector elements $x_i$ are introduced serially on the input fiber 38. As the elements $x_i$ progress through the coupler array, they arrive at times coinciding with the arrival times of various coefficients on the diagonals of the matrix. Each such "interception" or simultaneous arrival results in the generation of one term or subelement of one of the elements $y_i$ of the output vector $y$. For example, the output vector element $y_2$ is comprised of three summed terms $= a_{21}x_1$, $a_{22}x_2$ and $a_{23}x_3$. Each of these three terms is generated in a different coupler at a different time by the simultaneous arrival of the two operand, e.g., $a_{21}$ and $x_1$. The term is generated by the coupling of an amount of power from $x_1$ into the output fiber which is equal or proportional to the coefficient $a_{21}$. That is, the arrival of the coefficient $a_{21}$ in the processor 26 during the fourth time step (step 3, FIG.5(d)) is physically implemented in a fiber optic coupler by tuning the coupler such that it couples a selected amount of the power of $x_i$ into the output fiber. The selected amount is related to the magnitude of the coefficient $a_{21}$. In some cases, it will equal $a_{21}$.

Note that in the embodiment of FIGS. 4 and 5, the three terms of $y_2$ are generated at three different times in three different processors, e.g., time steps 4, 5 and 6 in processors 26, 24 and 22, respectively. In other embodiments the interceptions representing each term might all occur simultaneously in different processors, or seriatem in the same processor. One such alternative embodiment is discussed next.

In another embodiment, separate fibers could be coupled between the input signal source and the coupler array such that each coupler simultaneously received one of the input vector elements and at the same time received one coefficient from a selected row. The couplers would couple an amount of power into an output fiber proportional to or equal to the matrix coefficient from the row element assigned to that coupler. These coupled signals, consisting of the terms or subelements of the output vector element corresponding to the selected row, would be summed to provide the selected output vector element. This summation could be done by individual output fibers matched in length and leading to a detector such that all terms or subelements of the output vector element being generated arrive at a single detector simultaneously and are summed therein. Alternatively, a single output fiber could be used passing through all the couplers and coupled to a single photodetector. The terms of the output vector element, which would arrive at different times because of the different distance between each coupler and the detector, could be individually detected and converted to an electrical signal which could be stored in a memory until all the terms were in and then summed with all the other terms to arrive at the final value for the output vector element. Other methods of optically or electrically summing the terms of each output vector element will be apparent to those skilled in the art.

A key step in the above-mentioned methods of performing a matrix-vector multiplication involve timing the introduction of the input vector elements and the arrival of the matrix coefficients in the various couplers such that all the terms of the output vector element are generated either simultaneously or seriatem before leaving the array and that multiple processors be used to share the work of generating the terms. That is, the timing of the introduction of the input light signals and the arrival of the matrix coefficients is coordinated such that all the proper input elements intercept all the proper matrix coefficients, either simultaneously or at different times, such that all the terms or subelements of an output vector element are eventually generated by multiple processors in less time than it would take one processor to do all the multiplications. The subelements are then optically or electrically summed to derive the final output vector element.

It can be seen from the algorithm of FIGS. 4 and 5 that, for a band matrix of band width $w = p + q - 1$, the elements $y_i$ of the output vector start shifting out after $w$ units of time and continue thereafter to shift out at the rate of one element for every two units of time. Therefore, the array of inner product step processors can compute the $w$ components of $y$ in $2n + w$ units of time compared to the much larger time that would be needed for a single processor to do the same job.

The problems of computing convolutions, finite impulse response filters and discrete Fourier transforms are but special cases of the above algorithm, and therefore, can also be formulated as matrix-vector multiplication problems involving Toeplitz matrices. Thus, these problems can be solved rapidly by the processor array and algorithm above discussed. A Toeplitz matrix is a matrix which has the property that all the entries on the main diagonal or any offdiagonal, i.e., a line parallel to the main diagonal, are all the same. The convolution problem is the matrix-vector multiplication where the matrix is a triangular Toeplitz matrix such as is shown in FIG. 6. FIG. 6 represents the matrix-vector multiplication representing the convolution of the vectors a and x.

A p-tap finite impulse response filter can be viewed as a matrix-vector multiplication where the matrix is a band upper triangular Toeplitz matrix with band width w=p. FIG. 7 represents the matrix-vector multiplication representing a four tap filter.

A discrete Fourier transform can be computed as shown by the matrix-vector multiplication of FIG. 8. FIG. 8 represents the computation to derive the discrete Fourier transform of the vector x.

As mentioned above, the above-described processor array and algorithms can be implemented using single mode, fiber optic waveguides and tunable, fiber optic directional couplers. Frequency capabilities well above a gigahertz have been demonstrated in fiber optic recirculating and tapped delay lines. Further, the low dispersion in single mode fiber gives extremely high modulation bandwidths.

Figure 9:
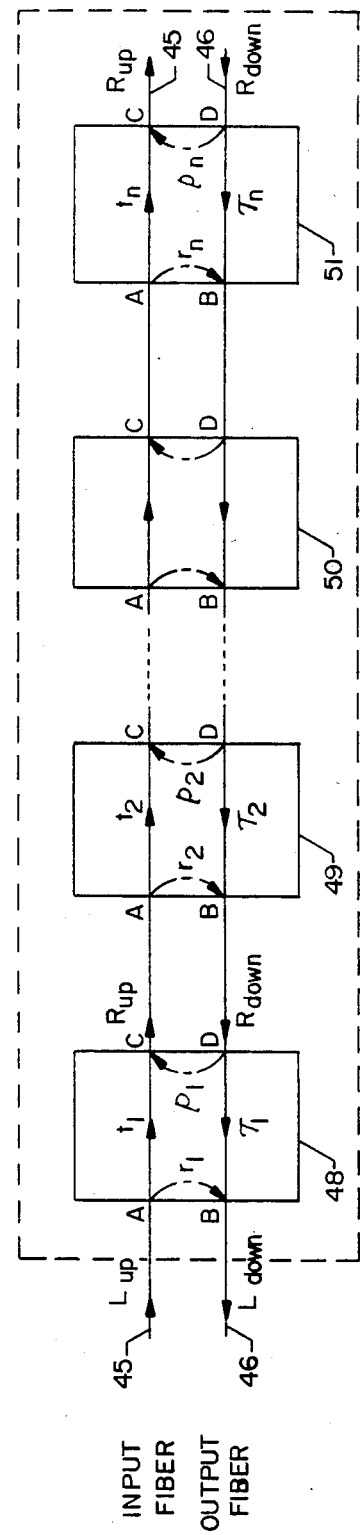
FIG. 9 shows an array of fiber optic inner product step processors.
Figure 13:
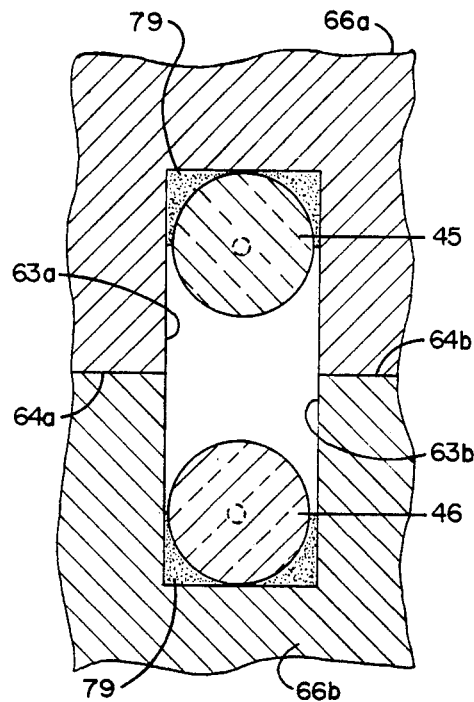
FIG. 13 shows a cross section of the coupler of FIG. 12 at the section line 13—13 in FIG. 12.

FIG. 9 shows a diagram of a single mode, fiber optic processor array which is comprised of a plurality of fiber optic inner product step processors. The array consists of two single mode fiber optic waveguides consisting of an input fiber 45 and an output fiber 46. Several couplers 48–51 are distributed along the length of the fiber. Each of the couplers 48–51 has four ports, A–D. There are two inputs, A and D, and two outputs, B and C. The input fiber 45 enters the array 52 as the light signal $L_{up}$ whereupon it enters the port A of the coupler 48 traveling from left to right and exits from the port C of that coupler. The input fiber 45 continues through the array from left to right carrying the $L_{up}$ light signal into the A ports and out from the C ports of each of the couplers 48–51 finally leaving the array as the signal $R_{up}$ from the port C of the coupler 51.

The output fiber 46 is a single mode fiber which enters the array 52 at the port D of the coupler 51 as the signal $R_{down}$ traveling symbolically from right to left. As will be seen above, the light signals, in reality, travel in both fibers in the same direction through each coupler, but the output fiber is coiled so as to feed coupled energy from the input fiber back to the previous coupler for coupling back into the input fiber. The output fiber 46 continues through the array entering each coupler at the port D and leaving each coupler at the port B. The output fiber 46 leaves the array from the port B of the coupler 48 as the $L_{down}$ signal.

The length of the optical fibers between the couplers 48–51 and the number of couplers in the array depends upon the particular application for which the structure is intended. The directional couplers 48–51 may be as described by Bergh, Kotler and Shaw, in "Single Mode Fiber Optic Directional Coupler," *Electronic Letters*, Vol. 16, No. 7, Mar. 27, 1980, and U.S. patent application Ser. No. 139,511, now U.S. Pat. No. 4,493,528, filed Apr. 11, 1980, entitled "Fiber Optic Directional Coupler", the details of which are hereby incorporated by reference. Such couplers are adjustable such that the amount of light energy coupled between the fibers can be varied from 0% to 100%.

The couplers 48–51 are linear, symmetric devices whose optical characteristics can be described by the operators t, $\rho$, r and $\tau$. Referring to the coupler 48 as exemplary of all the couplers in FIG. 9, the four above-mentioned operators are defined in terms of the input and output signals from the coupler 48. That is:

$$L_{down} = r_1 L_{up} + \tau_1 R_{down} \tag{15}$$

and $$R_{up} = t_1 L_{up} + \rho_1 R_{down} \tag{16}$$

Equations (15) and (16) ignore losses in the coupler which are generally 5% or less. In physical terms, Equation (15) means that the light power of the light wave at port B at any instant is equal to the light power of the wave entering port A times the tunable coupling operator $r_1$ plus the light power of the wave entering at the port D times the transmission operator $\tau$ less losses. The operator $\rho_1$ is equal to r, because the coupler is symmetric. Likewise, the light power of the light wave leaving at port C is equal to the light power entering at port A times the transmission operator $t_1$ plus the light power entering at the port D times the feedback coupling coefficient $\rho_1$ less 5% or less losses. The operators $r_1$ and $t_1$ are related as are $\tau_1$ and $\rho_1$ because of conservation of energy. That is:

$$r_1 + t_1 = 100\% \text{ approximately} \tag{17}$$

and $$\rho_1 + \tau_1 = 100\% \text{ approximately} \tag{18}$$

Error should be within 5% because of losses in the coupler. Energy entering the coupler is neither created nor destroyed; thus, the same amount of energy that enters each coupler, less some small losses, must leave the coupler. Thus, when $r_1$ and $\rho_1$ are tuned to couple more power between the fibers, the operator $t_1$ and $\tau_1$ decrease in proportion to the increase in $r_1$ and $\rho_1$.

The structure of FIG. 9 represents the first known fiber optic, systolic array processor. With feedback coupling present, the structure of FIG. 9 can also act as a lattice fiber within certain limits. That is, a lattice filter is formed by every recirculation loop between two couplers. For example, the first coupler 48 couples a selectable amount amount of energy between the input fiber 45 and the output fiber 46 as determined by the coupling operator $r_1$. It also couples a selectable amount of energy between the output fiber 46 and the input fiber 45 as determined by the coupling perator $\rho_1$. The second coupler 49 does the same thing. That is, part of the energy entering the port A of the coupler 49 in the fiber 45 is coupled into the output fiber 46 by the coupling operator $r_2$. The operator $r_2$ is selectable to any amount between 0 and 100%. This coupled energy is guided back into the port D of the coupler 48 by the output fiber 46 where a selectable amount of it is coupled back into the input fiber 45 by the first coupler 48. The amount of energy fed back into the input fiber 45 is determined by the coupling operator $\rho_1$ which is selectable by the operator. This recirculation loop creates a "pole" or peak in the transfer function of the array comprised of the couplers 48 and 49. Since the array is passive, the system will be stable.

The two coupler array has two outputs, i.e., port C of the coupler 49 and port B of the coupler 48. These two outputs each have a different transfer function relative to the input at port A of the coupler 48.

A transfer function is the impulse response of the system. That is, an impulse has infinite amplitude and zero width which has an infinite number of Fourier series sinusoidal components of different frequencies and equal magnitude which, when combined, create the impulse signal in the time domain. The transfer function defines how the system affects the amplitude and phase of each of the frequency components of the input signal thereby defining the magnitude of that component at the output. When all the output components are combined, an output signal results that may be different than the input signal. Poles are peaks in the transfer function and zeroes are zero or null points in the transfer function.

The transfer function at the output of the array at the port C of the coupler 49 has only poles, while the transfer function at the output at the port B of the coupler 48 has both poles and zeroes. The location of these poles and zeroes in the s plane (or Z plane) of Fourier analysis can be controlled by selection of the coupling operators r and $\rho$ and by selection of the length of the fibers 45 and 46 between the couplers which determines the loop delay $T_d$. Complete specification of any location for any pole or zero is not possible at this time as far as applicant is aware, but substantial control is possible.

A more detailed analysis of use of the structure of FIG. 9 as a systolic array processor follows. In a systolic array, data flows from the computer memory and passes through many processing elements before it returns to memory. The interactions of the input data with the flowing partial results permit multiple computations for each I/O memory access. The building block of such systolic arrays is, as mentioned above, the inner product step processor depicted in FIG. 1. The mathematical operation performed by the inner product step processor is as given in Equation (1).

It can be seen from study of Equations (15)–(18) that the directional couplers 48–51 can be easily used as inner product step processors under certain conditions. If the coupling coefficient is small, r is small and p can be ignored which transforms Equation (15) to:

$$L_{down} = rL_{up} + R_{down} \quad (19)$$

since t is approximately one for small p. Likewise, Equation (16) becomes:

$$L_{up} = R_{up} \quad (20)$$

for small r and p such that t is approximately one and p can be ignored. Equation (19) represents the realization that the linear, symmetrical, fiber optic coupler can function as an inner product step processor for weak backward coupling.

The assumptions underlying Equations (19) and (20) are good approximations for small coupling coefficients r and $\rho$ because, for weak coupling, the signal power on the output fiber 46 in FIG. 9 is always about one order of magnitude less than the signal power on the input fiber 45. For example, if $r_N = \rho_N = 0.10$, then the signal power on the fiber 46 at port B of the coupler 51 is:

$$L_{down} = 0.1 L_{up} + R_{down} \quad (21)$$

where $R_{down}$ is initially zero for matrix-vector multiplication as discussed with reference to FIGS. 3–5. That is, the output vector elements exit on the fiber 46 as the signal $L_{down}$ and $R_{down}$ entering the coupler 51 at the port D is zero. The elements of the output vector y are summations of the coupling operators $r_n$ set from the matrix coefficients of the matrix 30 times the elements of the input vector $x_i$ on the fiber 45. Weak coupling therefore results in one order of magnitude difference between the signal power on the fibers 45 and 46.

Because of this order of magnitude difference, the effect of $\rho$ on the input fiber 45 is minimal. That is, if $r = \rho = 0.10$, the signal power on the fiber 46 will affect the signal power on the fiber 45 only to the extent of two orders of magnitude down the power scale, i.e., the power on the output fiber 46 (down one order of magnitude) multiplied by the coupling coefficient $\rho$ (down another order of magnitude). The result is an effect on the input fiber 45 which is two or more orders of magnitude below the signal power of the input vector on the fiber 45.

Referring to FIGS. 10 and 11 there are shown two physical embodiments of the array. FIG. 10 shows an embodiment with backward coupling by virtue of the direction of winding of the output fiber 46. FIG. 11 shows an embodiment with forward coupling by virtue of an opposite direction of winding of the fiber 46 compared to the embodiment of FIG. 10. In FIGS. 10 and 11 it is seen that the output fibers 46 carry light through the couplers 48–51 in the same direction. However, the direction of winding of the output fiber 46 is such that in FIG. 10 the output vector signal leaves the array in the opposite direction from the direction which the output vector leaves the array in FIG. 11 such that energy coupled into the output fiber 46 in one coupler is led back to the previous coupler where it is partially or wholly recoupled into the input fiber 45. From the second coupler, the energy is carried again to the first coupler resulting in recirculations between the couplers. That is, in FIG. 10, recirculations occur between the couplers 49 and 48, between couplers 50 and 49 and between the couplers 51 and 50. In contrast, in FIG. 11, energy coupled into the output fiber 46 is fed forward to the next coupler. In FIG. 10 this reversal manifests itself as the port D of the coupler 48 being on the same side of the coupler as the port A, contrary to its placement in the symbolic array of FIG. 9.

More precisely, it can be seen that in FIG. 11, feed forward energy is coupled in the coupler 48 by the coefficient $r_1$ from the input fiber 45 to the output fiber 46. This energy travels through the loop 52 and enters the coupler 49 at the port D. In the coupler 49, the energy is coupled back into the input fiber 45 in proportion to the coupling coefficient $\rho_2$. From the coupler 49 this energy is recoupled back into the output fiber in the coupler 50. By each coupling the amount of this energy is reduced by the coupling coefficient which is always less than 1. The energy, therefore, continues to grow smaller with each coupling. The embodiment of FIG. 11 can be used as a transversal filter having a number of taps equal to the number of couplers.

In contrast, in the FIG. 10 embodiment, the energy coupled from the input fiber 45 into the output fiber 46 in the coupler 49 returns in the fiber 46 and is coupled back into the input fiber 45 in the coupler 48 in proportion to the coefficient $p_1$. From the coupler 48, the feedback energy travels forward to the coupler 49 and is again coupled into the output fiber 46 in proportion to the coefficient $r_2$. The same is true of the energy coupled into the output fiber 46 in each of the couplers 49–51, i.e., the energy is returned to the previous coupler. This structure creates feedback coupling which can be advantageously used to create a lattice filter because it provides for poles or peaks in the transfer function which are programmable in location to some extent.

A lattice filter is more general than a transversal filter in that it offers a transfer function which has both poles and zeroes. In contrast, a transversal filter has only zeroes. The physical significance of zeroes in a transfer function is that the zeroes represent frequencies of the input signal which the filter will completely block. As noted above, a transfer function represents the response of a system to an impulse input, i.e., an infinite series of sinusoids of different frequencies and the same amplitude. The transfer function is plotted in terms of amplitude of the output versus frequency. That is, the transfer function of the system is the output amplitude and phase of the system at each of the component frequencies of the input waveform. A zero in the transfer function means that no output will occur for input frequency components at the frequency of the zero.

The transfer function is a useful concept because every signal in the time domain can be thought of as a combination of different frequency sinusoids of different amplitudes. This series of sinusoids can be applied to any systems and the response of the system to each frequency sinusoid can be computed from the transfer function. The output will then consist of a combination of sinusoids having different amplitudes and phases than the corresponding input sinusoids by the action of the system on each frequency component as symbolized by the transfer function. These output sinusoids can be combined to derive the output signal in the time domain which results from application of the given input signal to the system. The input series of sinusoids is represented by the Fourier transform of the input signal.

Programmable lattice filters are very desirable because they offer more degrees of freedom for the designer in terms of the number of transfer functions which are available, i.e., the transfer function can be tailored to the specific application. In the embodiment of FIG. 10, a certain class of lattice filters can be implemented. A truly general optical lattice filter structure would require completely independent selection of the coefficients t, $\tau$, r and $\rho$ such that any of the four operators which describe the coupler could be any number, positive or negative, and either more or less than one. With known couplers of the type designated herein, the coefficients t, $\tau$, r and $\rho$ are not independent, but instead are all determined relative to each other once the coupling operator r is established; that is, the coupling operator r establishes $\rho$ and therefore also establishes t and $\tau$ by conservation of energy. Further, because the couplers 48-51 are passive, no amplification in the couplers is available. Therefore all the coefficients r, $\rho$ t and $\tau$ are positive and between zero and one. Nevertheless certain lattice filter transfer functions can be implemented with the structure of FIG. 10, and adjustments in the transfer function can be made. These adjustments are made by varying the lengths of the loops 55-57 in the ouput fiber 46 between the couplers 48-51 and by varying the lengths of the loops 59-61 in the input fibers between the couplers 48-51. Further adjustments in the transfer function can be made by adjusting the coupling operator r in any or all of the couplers 48-51.

The scattering and recirculation effects in the loops 55-57 and 59-61 allow the system of FIG. 10 to also be used to model physical phenomena described by the Redheffer scattering formalism. A physical system such as light passing through a series of plane, two-way, partially reflecting and partially transmitting mirrors is described by this Redheffer formalism and is analogous to the feedback of the embodiment of FIG. 10.

As noted above, the embodiment of FIG. 11 can be used as a transversal filter. Transversal filters are well known in the art, and optical tapped delay lines have been used to implement them. For example, H. F. Taylor described a fiber optic transversal filter in "Fiber and Integrated Optical Devices For Signal Processing", published in SPIE, Vol. 176, *Guided Wave Optical Systems & Devices* (1979) at page 17. As described by Taylor, transversal filters are used in signal processing applications to implement narrow band filters and matched filters. The Taylor tapped delay line transversal filter uses individual modulators on fibers of different lengths and combines the optical outputs in a single photodetector. The individual modulators vary the tap weights and the individual fiber lengths determine the delay between taps and determines the tap spacing. Taylor's filter requires a single photodetector which would be optically coupled to the ends of all the individual fibers in the bundle, which detector would, of necessity, be of large physical dimensions. A transversal filter utilizing the embodiment of the embodiments of FIG. 11 would not need such a large photodetector, which is a significant advantage since small photodetectors can operate faster, i.e., at higher frequencies than large photodetectors.

E. Marom suggested a structure similar to the structure of FIG. 11 to implement a matched filter in optical delay line terms in "Optical Delay Line Matched Filters", *IEEE Transactions on Circuits and Systems*, Vol. CAS-25, No. 6 (June 1978). Marom's structure did not use variable directional couplers and used two multimode fibers, both carrying light signals in the same direction. In contrast, the applicant's structure of FIG. 11 provides variable coupling at the positions of the couplers 48-51 and uses monomode fibers, thereby eliminating the dispersion effects caused by multimode fibers. The variable couplers used in FIG. 11 allow the transfer function of the system to be programmed. That is, the zeros in the transfer function can be moved to change the band stop frequency characteristics of the filter by changing the tuning of the couplers. Further, the length of fiber between the couplers can be changed to alter the transfer function somewhat. Such programmability of the transfer function gives the designer greater flexibility in his designs and can open new avenues for uses not before possible.

Referring to FIGS. 12-15, a description of the embodiment of the couplers 48-51 will be given. As illustrated in FIGS. 12 to 15, the couplers of the present invention includes two strands 45 and 46 of a single mode fiber optic material mounted in longitudinal arcuate grooves 63A and 63B, respectively, formed in flat, confronting surfaces 64A and 64B, respectively, of rectangular bases or blocks 66A and 66B, respectively. The block 66A with the strand 45 mounted in the groove 63A will be referred to as the coupler half 70A, and the block 66B with the strand 46 mounted in the groove 63B will be referred to as the coupler half 70B.

Each of the strands 45 and 46 comprises a commercially available fiber of quartz glass which is doped to have a central core and an outer cladding. It will be seen below that the present invention is particularly advantageous for use with single mode fibers, which typically have a core diameter on the order of 10 microns or less and a cladding diameter on the order of 125 microns. However, the invention may also be employed with other types of fibers, such as multimode fibers. In the embodiment disclosed, single mode fibers are utilized; however, for clarity of illustration, the diameter of the strands 45 and 46 and their respective cores are exaggerated. Furthermore, test results described herein are for couplers utilizing single mode fibers.

The arcuate grooves 63A and 63B have a radius of curvature which is very large compared to the diameter of the fibers 45 and 46 and have a width slightly larger than the fiber diameter to permit the fibers 45 and 46, when mounted therein, to conform to a path defined by the bottom walls of the grooves 63. The depth of the grooves 63A and 63B varies from a minimum at the center of the blocks 66A and 66B, respectively, to a maximum at the edges of the blocks 66A and 66B, respectively. This advantageously permits the fiber optic strands 45 and 46, when mounted in the grooves 45 and 46, respectively, to gradually converge toward the center and diverge toward the edges of the blocks 66A, 66B, thereby eliminating any sharp bends or abrupt changes in direction of the fibers 45 and 46 which may cause power loss through mode perturbation. In the embodiment shown in FIG. 13, the grooves 63 are illustrated as being rectangular in cross-section; however, it will be understood that other suitable cross-sectional contours which will accommodate the fibers may be used alternatively, such as a U-shaped cross-section or a V-shaped cross-section.

At the centers of the blocks 66, in the embodiment shown, the depth of the grooves 63 which mount the strands 45 and 46 is less than the diameter of the strands, while at the edges of the blocks 66, the depth of the grooves is preferably at least as great as the diameter of the strands. Fiber optic material is removed from each of the strands 45 and 46 as shown at 78b in FIG. 15 to form the respective, identical, oval-shaped planar surfaces 78A, 78B, which are coplanar with the confronting surfaces 64A, 64B, respectively. These surfaces 78A, 78B will be referred to herein as the fiber "facing surfaces". Thus, the amount of fiber optic material removed increases gradually from zero towards the edges of the block 66 to a maximum towards the center of the block. This tapered removal of the fiber optic material enables the fibers to converge and diverge gradually, which is advantageous for avoiding backward reflection and excess loss of light energy.

In the embodiment shown, the coupler halves 70A and 70B are identical, and are assembled by placing the confronting surfaces 64A and 64B of the blocks 66A and 66B together, so that the surfaces 78A and 78B of the strands 45 and 46 are in facing relationship.

An index matching substance (not shown), such as index matching oil, is provided between the confronting surfaces 64. This substance has a refractive index approximately equal to the refractive index of the cladding, and also functions to prevent the optically flat surfaces 64 from becoming permanently locked together. The oil is introduced between the blocks 66 by capillary action.

Figure 16:
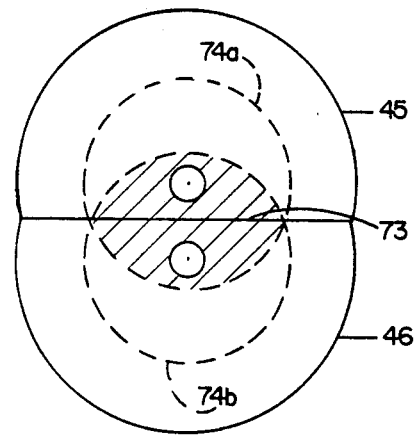
FIG. 16 illustrates the critical zone of coupling in the couplers.

An interaction region 72 is formed at the junction of the strands 45 and 46, in which light is transferred between the strands by evanescent field coupling. It has been found that, to ensure proper evanescent field coupling, the amount of material removed from the fibers must be carefully controlled so that the spacing between the core portions of the strands 45 and 46 is within a predetermined "critical zone". The evanescent fields extend into the cladding and decrease rapidly with distance ouside their respective cores. Thus, sufficient material should be removed to permit each core to be positioned substantially within the evanescent field of the other. If too little material is removed, the cores will not be sufficiently close to permit the evanescent fields to cause the desired interaction of the guided modes, and thus, insufficient coupling will result. Conversely, if too much material is removed, the propagation characteristics of the fibers will be altered, resulting in loss of light energy due to mode perturbation. However, when the spacing between the cores of the strands 45 and 46 is within the critical zone, each strand receives a significant portion of the evanescent field energy from the other strand, and optimum coupling is achieved without significant energy loss. The critical zone is illustrated schematically in FIG. 16 as including that area, designated by the reference numeral 73, in which the evanescent fields, designated by reference numerals 74A and 74B, of the fibers 45 and 46, respectively, overlap with sufficient strength to provide coupling, i.e., each core is within the evanescent field created by the light traveling in the other core. However, as previously indicated, mode perturbation occurs within the area 73 when the cores are brought too close together. For example, it is believed that, for weakly guided modes, such as the $HE_{11}$ mode in single mode fibers, or high order modes in multimode fibers, such mode perturbation begins to occur when sufficient material is removed from the fibers to expose their cores. Thus, the critical zone is defined as that area in which the evanescent fields 74 overlap with sufficient strength to cause coupling without substantial mode perturbation induced power loss.

Figure 14:
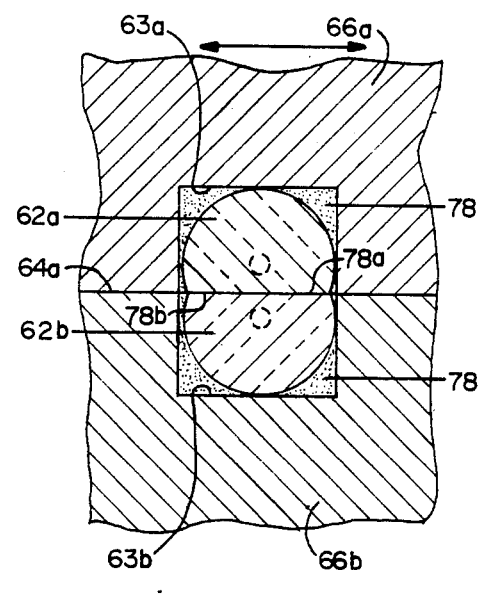
FIG. 14 shows a cross section of the coupler of FIG. 12 taken along the section line 14—14 in FIG. 12.
Figure 15:
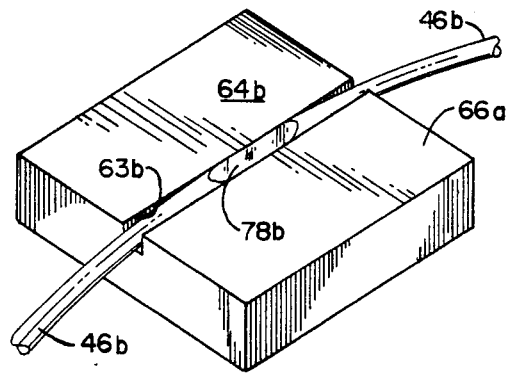
FIG. 15 shows a perspective view of one plate of the coupler of FIG. 9 showing the manner in which part of the fiber cladding is lapped away.

The extent of the critical zone for a particular coupler is dependent upon a number of interrelated factors such as the parameters of the fiber itself and the geometry of the coupler. Further, for a single mode fiber having a step-index profile, the critical zone can be quite narrow. In a single mode fiber coupler of the type shown in FIGS. 12–15, for example, the required center-to-center spacing between the strands 45 and 46 at the center of the coupler as shown in FIG. 14 is typically less than a few (e.g., 2-3) core diameters.

Preferably, the strands are (1) identical to each other, (2) have the same radius of curvature at the interaction region 32, and (3) have an equal amount of fiber optic material removed therefrom to form their respective facing surfaces 78A and 78B. Thus, the fibers 45 and 46 are symmetrical, through the interaction region 72, in the plane of the facing surfaces 78, so that the facing surfaces 78 are coextensive if superimposed. This ensures that the two fibers 45 and 46 will have the same propagation characteristics at the interaction region 72, and thereby avoids coupling attenuation associated with dissimilar propagation characteristics.

The blocks or bases 66A and 66B may be fabricated of any suitable rigid material. In one presently preferred embodiment, the bases comprise generally rectangular blocks of fused quartz glass approximately one inch long, one inch wide, and 0.4 inch thick. In this embodiment, the fiber optic strands 45 and 46 are secured in the slots 63 by suitable cement 79, such as epoxy glue. One advantage of the fused quartz blocks 66 is that they have a coefficient of thermal expansion similar to that of glass fibers, and this advantage is particularly important if the blocks 66 and fibers 45 and 46 are subjected to any heat treatment during the manufacturing process. Another suitable material for the block 66 is silicon, which also has excellent thermal properties for this application.

The coupler includes four ports labeled A, B, C, and D, in FIG. 12. When viewed from the perspective of FIG. 12, ports A and D, which correspond to strands 45 and 46, respectively, are on the lefthand side of the coupler, while the ports B and C, which correspond to the strands 45 and 46, respectively, are on the righthand side of the coupler. For the purposes of discussion, it will be assumed that input light is applied to port A. This light passes through the coupler and is output at port C and/or port B, depending upon the amount of power that is coupled between the strands 45 and 46. In this regard, the term "normalized coupled power" is defined as the ratio of the coupled power to the total output power. In the above example, the normalized coupled power would be equal to the ratio of the power at port B to the sum of the power output at ports B and C. This ratio is also referred to as the "coupling efficiency" and when so used is typically expressed as a percent. Thus, when the term "normalized coupled power" is used herein, it should be understood that the corresponding coupling efficiency is equal to the normalized coupled power times 100. In this regard, tests have shown that the coupler of the type shown in FIG. 12 has a coupling efficiency of up to 100%. However, the coupler may be "tuned" to adjust the coupling efficiency to any desired value between zero and the maximum of 100% power coupling, by offsetting the facing surfaces of the blocks 16A and 16B. Tuning the coupler changes the coupling efficiency and changes the coupling and transmission operators r, ρ, τ and t. That is, when the coupling efficiency is lowered, less power is coupled from part A to part B in FIG. 12. That means that 5 and ρ are decreased because the coupler is symmetric and that t and τ are increased since less energy leaving either fiber for the other means more energy remains in the original fiber and is transmitted through the coupler by conservation of energy. Such tuning is preferably accomplished by sliding the blocks 66A and 66B laterally relative to each other in the direction of the arrow in FIG. 14. The coupler is sensitive to displacements of the fibers in a direction which laterally offsets the planar faces such as the direction of the arrow in FIG. 14. However, the coupler is less sensitive to displacements which longitudinally offset the planar faces, i.e., in a direction perpendicular to he arrow in FIG. 4 and coming out of the page in orthogonal fashion. The coupler is relatively insensitive to displacement of the fibers which rotationally offsets the faces. The sensitivity of the coupling operators to displacement of the fibers depends upon the spacing of the cores of the fibers when the fibers are superimposed.

The coupler is highly directional, with substantially all of the power applied at one side of the coupler being delivered to the other side of the coupler. That is, substantially all of the light applied to input port A is delivered to the output ports B and C, without contradirectional coupling to port D. Likewise, substantially all of the light applied to input port D is delivered to the output ports B and C. Further, this directivity is symmetrical. Thus, light supplied to either input port C or input port B is delivered to the output ports D or A, respectively, and light supplied to either port A or port D is defined either to the port B or C respectively. Moreover, the coupler is essentially nondiscriminatory with respect to light polarizations, and preserves the polarization of the coupled light during the power transfer. Thus, for example, if a light beam having a vertical polarization is input to port A, the light coupled from port A to port B as well as the light passing straight through from port A to port C will remain vertically polarized.

Figure 17:
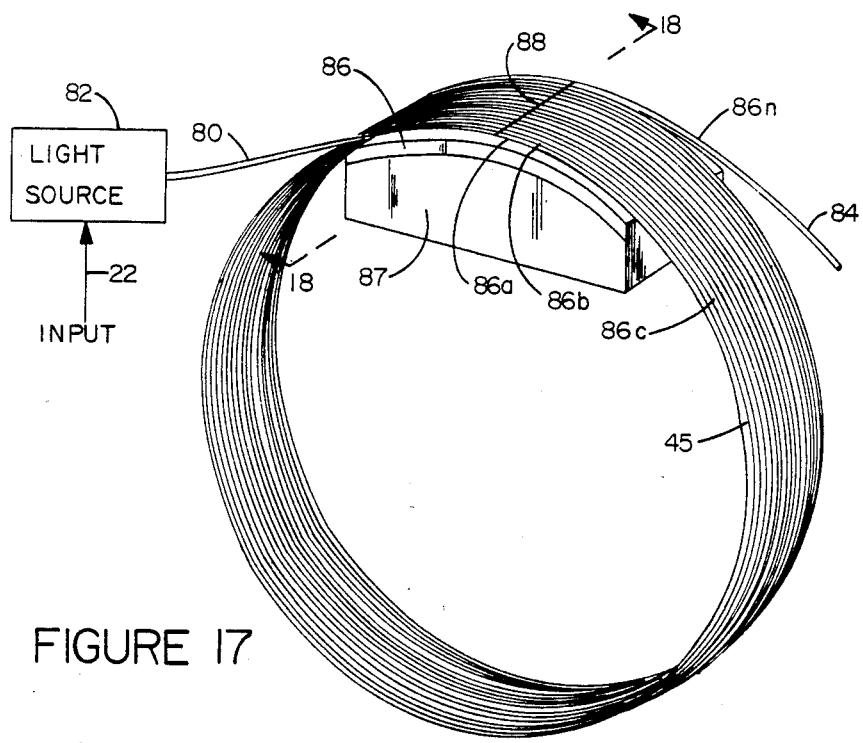
FIG. 17 shows a tapped delay line which, in combination with another of its type, could be used as a substitute for the individual couplers in the arrays of FIGS. 10 and 11 to implement a filter.
Figure 18:
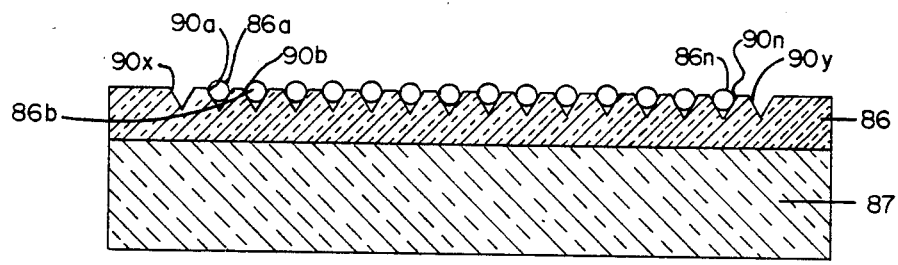
FIG. 18 shows a cross sectional view of the FIG. 17 structure along the view line 18—18 in FIG. 17.
Figure 19:
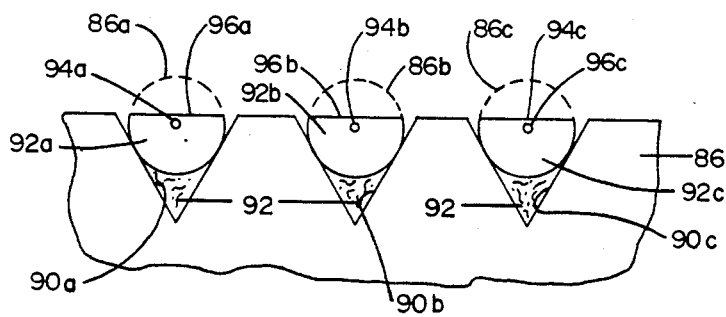
FIG. 19 shows a closeup view in cross section of the first three grooves of FIG. 18.

Referring to FIGS. 17-19 there is shown the construction for a fiber optic tapped delay line which could be used to implement the arrays depicted in FIGS. 10 and 11. Two of the constructions shown in FIG. 17 optically coupled together at the taps could implement the arrays of FIGS. 10 and 11 as will be apparent from the following discussion. In FIG. 17, a single element of optical fiber 45 is used, beginning at an input end 80 which is supplied with a light input signal from a light source 82, and ending at an output end 84. The optical fiber 45 is wound around a chip 86 with V-grooves 90a-90y formed therein. The chip 86 is a thin slice of silicon with grooves 90a-90y photolithographically etched therein and will be described in more detail later. The first portion of the fiber on the chip is designated the first winding 86a, and the second portion of the fiber 45 mounted on the chip 86 is designated 86b, and so on. At a lateral line 88 normal to the longitudinal axes of the fiber segments 86a-86n, taps are constructed so that each revolution of the optical fiber 45 is tapped at the lateral line 88. The construction of the chip 86 and the V-grooves and the manner by which the optical fiber 45 is laid in the V-grooves in the chip 86 is described in more detail in co-pending U.S. patent application Ser. No. 323,038 filed Nov. 19, 1981 for "Tapped Optical Fiber Delay Line". Standard photolithographic etching techniques known in the semiconductor industry can be used to form the V-grooves in the chip 86.

There is a need for great precision in the construction of the V-grooves such that they all are identical in width and depth since the fiber segments of the fiber 45 in the grooves must be coplanar. Any technique which will not meet that criterion can be used such as by laser or other chemical or mechanical machining. It has been found it is satisfactory to use 100 oriented silicon for the chip 86 with chemical etching by photolithographic techniques as is well known in the semiconductor manufacturing art. Silicon of the 100 orientation yields a V-groove with walls at an angle of 54.74 degrees.

The first step in forming the V-grooves is photolithographically etching flat grooves with the width of the flat grooves determined by the depth needed of the V-groove. The depth of the V-groove needed depends upon the size of the fiber being used.

Referring to FIG. 17, the preferred way to construct an optical tap is to have the optical fiber surface mounted in a curved configuration so that a flat portion of the optical fiber may be lapped to form a planar face to provide a tap of the light traveling within the fiber. To provide this curved configuration, the silicon chip 86 is mounted on a block of quartz 87 which has a curved upper surface. It has been found that a silicon chip of standard thickness (0.25 millimeter) and about three-centimeter length can be bent without breaking around a twelve-inch radius. An adhesive substance such as wax is used to hold the silicon chip 86 on the quartz block 87 in the curved configuration shown in FIG. 17. The optical fiber 45 may now be mounted on silicon chip 85.

Before the optical fiber 45 can be mounted in the V-grooves in the silicon chip 85, the portions of the optical fiber 45 which are to be mounted in the V- grooves preferably have the protective jacket removed. ITT type monomode fiber has a plastic jacket which may be removed by dipping it in sulfuric acid. The resiliency of the plastic jacket prevents precision in the lapping operation, so it should be removed. Corning type fiber has a lacquer jacket which may be removed by dipping it in acetone. Since the lacquer jacket is more solid than the plastic jacket, its removal is preferential rather than mandatory.

The installation of the fiber 45 in the V-grooves of the silicon chip 85 is best shown in FIG. 18 which shows a cross-sectional view along the line 18—18 in FIG. 17. FIG. 19 shows a cross-section of the first three grooves in more detail. A portion of the optical fiber 86a near the input end 80 of the fiber is mounted in the second V-groove 90a of the silicon chip 85. It should be noted that there is a first V-groove 90x which is not used to receive the optical fiber 45, but rather is used for alignment purposes. As shown in FIG. 19, before the fiber is mounted in the V-groove 90a, an adhesive substance 92 is placed in the bottom of the V-groove 90a. Therefore, when the portion 86a of the optical fiber 45 is placed in the V-groove 90a and the optical fiber 45 bottoms out against the sides of the V-groove 90a, it will be permanently retained there by the adhesive 92.

Following the placement of fiber portion 86a in the first V-groove 90a, a length L of the optical fiber is left between the center of the fiber portion 86a and the center of the second fiber portion 86b of the optical fiber 45, which is to be mounted in the second V-groove 86b. This length L is the length of optical fiber shown as one of the fibers forming the loop of fiber 45 in FIG. 17. It provides a delay time equal to the period of the desired fundamental frequency of the transversal filter or the desired loop delay for the matrix-vector multiplier to be constructed using the structure of FIG. 17.

It can be seen from FIGS. 17-19 that the optical fiber 45 is wound around the silicon chip 86 so that upon each successive revolution it is fitted into the next succeeding V-groove and secured there by the adhesive 92. When the last portion 86n of the optical fiber 45 has been fitted into the last V-groove 90n of the silicon chip, the optical fiber 45 terminates at the end 84 as shown in FIG. 17.

The next step is to mechanically lap the upper surface of the portions 86 of the optical fiber 45 at the lateral line 88. The portions 86 of the optical fiber 45, being mechanically mounted in the silicon chip by the adhesive 92, are stable enough to have portions of the cladding removed by lapping. This lapping operation will remove a portion of the cladding 92 to form a planar face similar to the face 78b, shown in FIG. 15. It is important to note that not all of the cladding material 92 (92a-c in FIG. 19) around the core 94 (94a-c in FIG. 19) of the optical fiber is to be removed. The distance between each core 94 and the lapped surface 96 of the fiber segments 86 in the V-grooves depends on the amount of light which is to be removed from the fiber at each tap. When small amounts of light are being extracted, the lapped surface 96 should be further from the core 94 of the fiber segments 86. Since it is desirable to have a high number of taps for certain applications, only a small amount of light can be removed at each tap. Therefore, between approximately five and ten microns of cladding will be left between the lapped surface 96 and the core 94 of each of the fiber segments 86.

Figure 20:
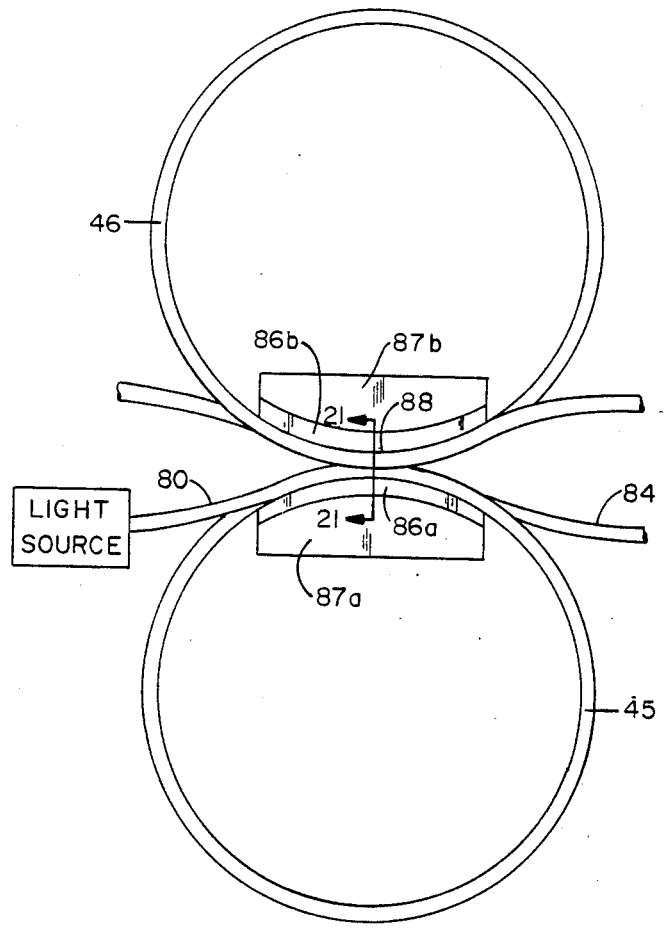
FIG. 20 is an alternative embodiment for either of the structures of FIGS. 10 and 11.
Figure 21:
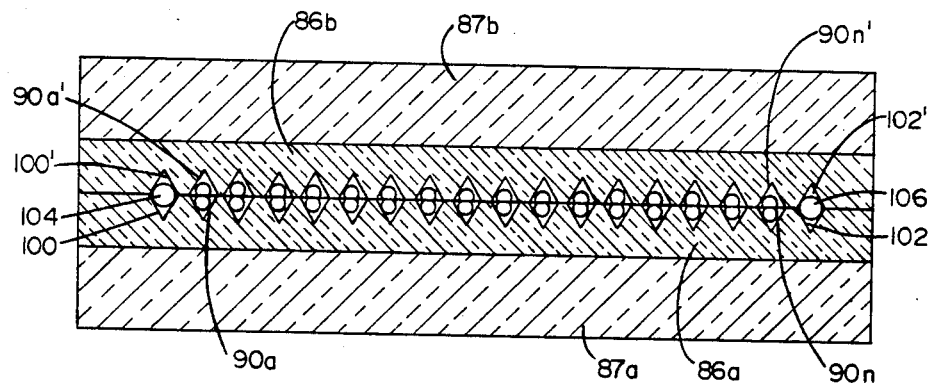
FIG. 21 is a cross sectional view of the structure of FIG. 20 in the optical coupling region at the view line 21—21.

To implement the arrays of FIGS. 10 and 11, two structures such as shown in FIG. 17 must be used which are optically coupled at the lapped portions of the fiber segments 86 at the line 88. This is illustrated in FIGS. 20 and 21. FIG. 20 shows the combined structure representing the structure of either FIG. 10 or FIG. 11 with the number of couplers equal to the number of turns of the fibers 45 and 46 in the V-grooves. whether the structure of FIG. 20 represents the structure of FIG. 10 or FIG. 11 depends upon the direction of the winding of the fiber 46. That is, if the fiber 46 is wound so as to carry the coupled light back to the next preceding tap, i.e., in the direction from which the light in the input fiber 45 came, then feedback or backward coupling is present and the structure can function as a lattice filter. If the winding direction is opposite, a transversal or matched filter will be implemented.

FIG. 21 shows a cross-section of the structure of FIG. 20 taken along the view line 22—22 in FIG. 20 corresponding to the line 88 in FIGS. 17 and 20. The structure is simply two chips 86a and 86b with V-grooves therein and supported by curved quartz blocks 87a and 87b affixed together such that the V-grooves 90a-90n in the chip 86a are in predetermined alignment with the V-grooves 90a'-90n' in the chip 85b. Alignment grooves 100 and 100' and 102 and 102' at the opposite ends of the chips 86a and 86b contain alignment beads 104 and 106. These alignment beads 104 and 106, and their corresponding alignment grooves, establish fixed reference points from which each of the V-grooves 90a-90n and 90a'-90n' can be precisely located. If it is desired that each coupler formed by a pair of V-grooves have the same coupling operators r and ρ as each of the other couplers, then each pair of grooves forming a coupler should be located the same distance from the alignment grooves plus a selected differential offset of one groove in the pair relative to he other groove so that each fiber pair has the same relative offset as each other pair. In some applications of lattice or transversal filtering this equal weighting of taps will be desirable.

It is also possible to form couplers with unequal coupling at each tap using the structure of FIGS. 20 and 21. In such applications the relative offsets of each of the fiber pairs in the opposing grooves can be established by varying the distance of one of the opposing grooves from the alignment groove versus the distance to the alignment groove for the opposite V-groove. Since the photolithographic operation described above can be controlled to within reasonable tolerances, such a method of offsetting the V-grooves can give filters with weighted taps.

Of course the weights can all be simultaneously changed by moving the blocks 87a and 87b relative to each other, but all the couplers will have their fiber pair offsets equally affected by the same amount which will result in new weights determined by the original weights plus the common offset. No individual control of the coupling efficiencies will be possible. Of course for certain applications, such a non-adjustable coupler situation is satisfactory such as in filters requiring fixed pole and zero locations in the transfer function. For individual control of the coupling efficiencies of each coupler in the array, the embodiments of FIGS. 10 and 11 must be used. The advantage of the embodiment of FIGS. 20 and 21 is that many couplers can be inexpensively built to implement very complicated transfer functions and to precisely tailor the pass and stop bands of the lattice and transversal filters by many different tap weights.

The structure of FIGS. 20 and 21, as will be seen below, can also be used to perform matrix-vector multiplication operations. The advantage of the structure of FIGS. 20 and 21, as will become apparent from the discussion below, is that very large matrices with many coefficients can be handled in a very fast systolic array using pipeline concepts.

Turning to FIG. 22, there is shown a 2×2 Toeplitz matrix 110, multiplied by an input vector $x_1$ 112, to give an output vector y. FIGS. 22–24 will be used to illustrate how the arrays of FIGS. 10, 11 or 20 may be used to perform matrix-vector multiplication on Toeplitz matrices. If the matrix 110 is a Toeplitz matrix, the coefficients $a_{11}$ and $a_{22}$ will be equal because they are on the same diagonal. The elements $y_1$ and $y_2$ of the output vector are equal to:

$$y_1 = a_{11}x_1 + a_{12}x_2 \quad (22)$$

and $$y_2 = a_2x_1 + a_{22}x_2 \quad (23)$$

FIG. 23 represents the array of fiber optic couplers which can be used to perform the matrix-vector multiplication of FIG. 22. As noted above, each of the couplers 114–116 can be described by transmission and coupling operators r, t, p and $\tau$. Therefore, each of the couplers 114–116 can be approximately characterized in terms of its input and output light signals $L_{up}$, $R_{up}$, $L_{down}$ and $R_{down}$ and the operators t, r, p and $\tau$ per equations (15) and (16). Since weak coupling operators r and p are assumed for matrix-vector multiplication, only the transmission and coupling operators t, r and $\tau$ are considered since, as described above, the effects of p on the input optical fiber 45 are negligible for weak coupling. To perform the mathematical operation represented by FIG. 22, each of the couplers 114–116 operates as an inner product step processor and each is characterized by the equations (19) and (20).

To perform the mathematical operation represented by FIG. 22, the coupler 114 is tuned so that its coupling operator $r_1$ equals the matrix coefficient $a_{12}$. The coupler 115 has its coupling operator $r_2$ tuned to the matrix coefficients $a_{11}$ and $a_{22}$, and the coupler 116 has its coupling operator $r_3$ tuned to the matrix coefficient $a_2$, $a_{21}$. In the example illustrated in FIG. 23 $a_{12} = \frac{1}{8}$, $a_{11} = a_{22} = \frac{1}{4}$ and $a_{21} = \frac{1}{2}$.

The operation of the couplers 114–116 in performing the matrix-vector multiplication is illustrated in FIGS. 24(A)–(D). The operation begins, as shown in FIG. 24(A), with the serial introduction into the input optical fiber 45 of the two light signals which represent the elements of the input vector x, i.e., the signals $x_1$ and $x_2$. Time is increasing to the right in all of FIGS. 24(A)–(D). Therefore, the signal $x_1$ arrives at the coupler 114 on the fiber 45 earlier than the signal $x_2$.

The signals $x_1$ and $x_2$ are traveling in the fiber 45 from left to right in FIG. 23. The coupler 114 operates on the signals $x_1$ and $x_2$ such that a signal $a_{12}x_1$ is generated in the output optical fiber 46 since $r_1 = a_{12}$. This signal $a_{12}x_1$ leaves the coupler 114 first in time. Symbolically, the signals in FIG. 24(B) can be thought of as emerging from the coupler 114 moving from right to left on the output fiber 46 with the signal $a_{12}x_1$ emerging first. In reality the output signals pass through the couplers through the couplers in the same direction as the input signals. The signals $a_{11}x_1$ and $a_{21}x_1$ are coupled into the output fiber 46 as the signal $x_1$ passes through the couplers 115 and 116, respectively.

FIG. 24(C) shows the signals that are generated in the output fiber 46 as the input signal $x_2$ passes through the couplers 114–116. These signals must be summed with the signals generated from the input signal $x_1$ because of equations (22) and (23) above. Thus, the signal $a_{12}x_2$ must be coupled into the output fiber 46 just as the signal $a_{11}x_1$ is arriving at the coupler 114. The time spacing of introduction of the input signals $x_1$ and $x_2$ must therefore be equal to the round trip propagation time $T_d$ of a light pulse from one coupler to the next coupler and back to the preceding coupler.

Only the backward feedback can be used for matrix-vector multiplication in embodiments such as shown in FIG. 9 and FIG. 10 because of the requirement for proper interception of input light signals and matrix coefficients and the need to sum the output signals. Because of the time spacing $T_d$ between input pulses, the signals $a_{11}x_1$ and $a_{12}x_2$ are optically summed in the output fiber 46 as are the signals $a_{21}x_1$ and $a_{22}x_2$.

FIG. 24(D) shows the resulting output on the output fiber 46. Since only the middle two pulses $y_1$ and $y_2$ define the output vector y, the pulses $a_{12}x_1$ and $a_{21}x_2$ are discarded. This can be done electronically by selecting from the output of a detector only the signals during the time window shown in FIG. 24(D). This can be done in any conventional manner. The structure used to do it is not critical to the invention but one way to do it would be to establish the time base and spacing of the input pulses with a counter. The time window would then correspond to a series of numbers in the count. Two decoders could be coupled to the output of the counter to determine when the first number in the series marking the time $t_1$ occurred. This decoder would turn on or open the gate on the output of the detector at time $t_1$. The second decoder, coupled to the output of the counter, would determine when the count corresponding to $t_2$ occurred and turn off or close the gate on the output of the detector at that time.

By using the time window technique, it may be possible to use larger coupling operators r and $\rho$ and not ignore the effects of $\rho$. However, since the $\rho$ operator in each coupler causes recirculations between the couplers 114–116, some of these recirculations may fall within the time window and introduce errors. However, it is possible under some circumstances to adjust the coupling of the couplers 114–116 such that the coupling operators r are other than exactly equal to the matrix coefficients so that the couplers can compensate for some or all of the errors introduced by recirculation.

Figure 25:
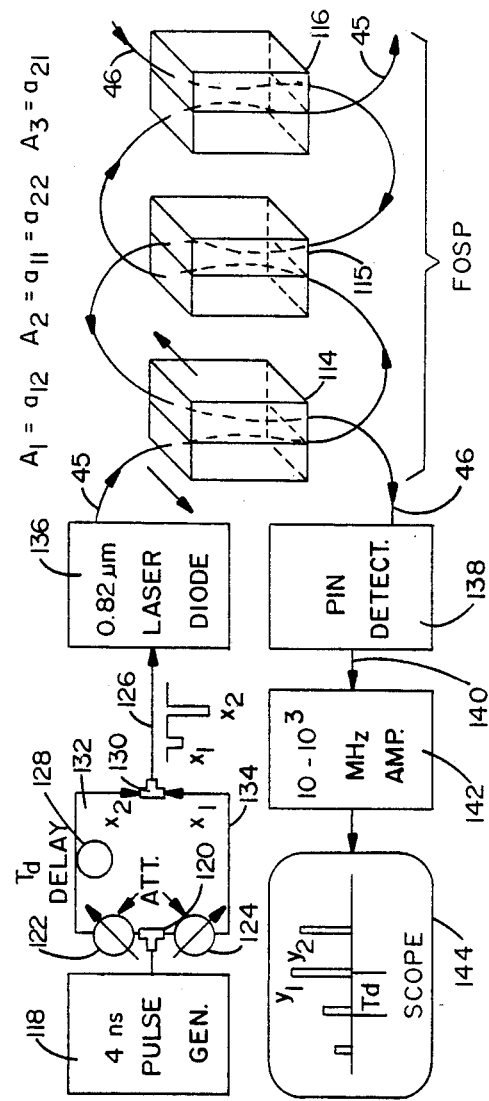
FIG. 25 shows an apparatus for performing the matrix-vector multiplication illustrated in FIGS. 22-24.

Turning to FIG. 25, there is shown an apparatus for performing the matrix-vector multiplication illustrated in FIGS. 22–24. A pulse generator 118 generates an electrical pulse. This pulse is split into the number of elements in the input vector by a splitter means represented by the splitter 120. The splitter 120 in FIG. 25 can be any conventional design. The two pulses from the splitter 120 are coupled into the inputs of conventional attenuators 122 and 124 which serve to attenuate the two pulses to the levels of the pulses $x_1$ and $x_2$. A delay line 128 serves to delay the pulse $x_2$ for the period $T_d$ to achieve the proper pulse spacing. A conventional mixer 130 then recombines the pulses on the conductors 132 and 134 onto the conductor 126 where they are coupled to the input of a laser diode 136. There they are converted to light pulses on the fiber 45.

The fiber 45 then passes through the couplers 114–116 which couple varying amounts of power into the output fiber 46 as previously described regarding FIGS. 22–24. The output fiber 46 is coupled to the input of a photodetector 138 which reconverts the pulses to electrical pulses on the line 140. The pulses are amplified in an amplifier 142 and coupled to the input of an oscilloscope 144 where they are displayed. The embodiment of FIG. 25 does not use a time window gating circuit, depending instead upon manual selection and measurement of the middle two pulses on the scope display.

FIG. 26 illustrates a matrix-vector multiplication example which was actually used with the physical system depicted in FIG. 25 to verify the correct operation of the system.

FIG. 27 illustrates the light pulses actually observed at the input to the system of FIG. 25 and the light pulses actually observed at the output. Note that the input pulses $x_1$ and $x_2$ are equal because both elements of the input vector x are 1 in FIG. 26. The first output pulse $a_{12} x_1$ represents $1 \times 1 = 1$. The second output pulse $a_{11} x_1 + a_{12} x_2$ represents $(1 \times 1) + (1 \times 1) = 2$. The third output pulse $a_{21} x_1 + a_{22} x_2$ represents $(0 \times 1) + (1 \times 1) = 1$. The fourth output pulse $a_{21} x_2$ does not exist because its amplitude is $0 \times 1 = 0$. Similar analysis applies to FIGS. 28 and 29 which show the same things as FIGS. 26 and 27 except for a different set of coefficients in the matrix and a different input vector.

Any $N \times N$ size matrix can be handled with the arrays of FIGS. 10 and 20. It is only necessary to have $2N - 1$ couplers corresponding to the $2N - 1$ main and offdiagonals of the matrix. The components of the input vector enter the couplers progressively in such a way that each coupler sees matrix elements from a single main or offdiagonal. In the future when couplers become available where the coupling and transmission operators can be rapidly changed, it will be possible to handle the general, non-Toeplitz matrix. Until then only Toeplitz matrices can be handled if the high inherent bandwidth of the fiber optic processor array is to be fully utilized. In the general $N \times N$ Toeplitz matrix case, the N components of the output vector will appear on the output fiber 46 following the $(N-1)$ the output pulse.

Recirculations and loop losses have been neglected in the multiplier analysis given so far. This comes from ignoring the $\rho$ coupling operator. Proper operation of the multiplier array illustrated in FIGS. 10, 20 and 25 depends only on the device impulse response rather than on the individual coupling ratios and loop losses. That is, the overall transfer function of the array is the critical factor in achieving accurate results rather than exact matching of the coupling operators to the matrix coefficients and accounting for loop losses. Thus, for a given $N \times N$ Toeplitz matrix in $a_{ij}$, the $2N-1$ couplers can be properly adjusted to yield an impulse response, i.e., an overall transfer function, which gives pulse heights in the output vector proportional to $a_{1N}, a_{2N-1}, \ldots a_{iN-1+1}, \ldots a_{N1}$ respectively. In such cases, the weak coupling requirement can be removed. That is, the weak coupling requirement can possibly be removed if the couplers can be adjusted to properly account for the resulting recirculations and give the correct overall transfer function to get a correct output vector.

Removal of the weak coupling requirement results in a lower data rate however, since a sequence of delayed pulses resulting from recirculations between couplers may follow and possibly overlap, the time window for the output vector. The next input vector therefore must wait for these recirculation pulses to die down or be squelched before it may be coupled into the input fiber. This results in a reduced data rate unless squelching can be rapidly accomplished.

A major advantage of the processor array described herein is the single fiber nature of the output. This enables the use of a very small and, therefore, very fast detector without sacrificing light collection efficiency.

The factors that determine the ultimate accuracy of the multiplier are the settings of the couplers to program the impulse response, the time delay between the input pulses, the loop delays, and the residual recirculation and frequency bandwidth of the electronic components. With smaller components and a closely packed geometry, the delays can be reduced to the order of 0.1 n s allowing a 10 Ghz data rate. Similar or higher data rates could be obtained if the systolic array were implemented using integrated optics techniques.

With sufficient recirculation the fiber optical signal processor arrays of FIGS. 10 and 20 can serve as feedback lattice filter with an infinite impulse response as opposed to the finite impulse response of the tapped delay line and a programmable transfer function. This lattice type filter has the advantage that it has both poles and zeros compared to only zeros in tapped delay line transversal filters. This offers more flexibility to a designer that needs a transfer function with poles in it. The order of the system, i.e., the number of poles, depends upon the number of loops between couplers. A dual feed forward lattice filter can also be implemented by replacing the scattering couplers by forward couplers which operate on $L_{up}$ and $L_{down}$ to produce $R_{up}$ and $R_{down}$. The ability of this last forward transfer structure to perform matched filtering, has already been analyzed and demonstrated using multimode fibers on non-tunable couples by E. Marom, supra.

While the invention has been described with reference to specific embodiments and applications, the description is illustrative of the invention and not limiting the invention. Various modifications and applications may occur to those skilled in the art without departing from the true spirit and scope of the invention as defined by the appended claims.

What is claimed is:

1. A method of matrix-vector multiplication of an input vector times a matrix to derive an output vector performed in an array of tunable fiber optic couplers which couple light energy between fiber optic waveguides comprising the steps of:
    introducing a light pulse representing an element of said input vector into a first said fiber optic waveguide;
    coupling an amount of power from said first fiber optic waveguide through a coupler in said array and into an output waveguide, wherein said coupler has a coupling ratio which is related to a coefficient in said matrix so that said amount of power in said output waveguide represents a product of multiplication of said element of said input vector and said coefficient in said matrix; and
    detecting said output vector as an amount of light emerging from said array onto said output waveguide.

2. A method of matrix-vector multiplication of an input vector by a matrix to derive an output vector in an array of tunable fiber optic couplers which couple light energy between first and second fiber optic waveguides comprising the steps of:

introducing a plurality of light pulses representing elements of said input vector into a first of said fiber optic waveguides;

coupling, from said first waveguide into said second waveguide through at least one of said couplers, an amount of power from said plurality of light pulses, said power related to a coefficient in said matrix;

guiding power coupled in said second waveguide from each input pulse to other couplers in said array for summing with power coupled from other input pulses; and detecting said output vector as amplitude of the light guides which emerge from said array on said second waveguide.

3. A method as defined in claim 1 wherein each said coupler is tuned to have a coupling operator which is equal to a coefficient in said matrix.

4. A method as defined in claim 1 or 2 further comprising the step of determining the amplitude of light signals emerging on said second waveguide only during a predetermined time window.

5. A method as defined in claim 4 wherein said matrix is $N \times N$ and said array comprises $2N-1$ couplers, and wherein the method further comprises the step of tuning each coupler such that it has a coupling operator which is equal to the coefficients on one of the $2N-1$ main or offdiagonals of said matrix, where N is greater than zero.

6. A method as defined in claim 5 wherein said matrix is a Toeplitz matrix and each said coupler is tuned to a value of a coefficient on one of $2N-1$ diagonals in said matrix, where N is greater than zero.

7. A method as defined in claim 5 wherein the step of detecting said output vector occurs during a time window which starts following a $(N-1)^{TH}$ output signal, where N is greater than zero.

8. A method of matrix-vector multiplication comprising the steps of:

introducing a plurality of light signals representing components of a vector into an array of fiber optic couplers;

coupling an amount of power from each signal into an output waveguide, wherein said amount of power is determined by coupling ratios in said fiber optic couplers, and wherein said coupling ratios represent elements of a matrix;

summing selected groups of signals in said output waveguide; and detecting the selected groups of summed signals in said output waveguide.

9. A method of matrix-vector multiplication comprising the steps of:

(1) introducing a first light signal representing a first element of an input vector into a plurality of fiber optic couplers at different times;

(2) coupling in each said coupler a predetermined amount of energy from said light signal into an output waveguide to form a first plurality of intermediate signals;

(3) guiding each said first intermediate signal into another of said couplers;

(4) introducing a second light signal representing a second element of said input vector into a plurality of said couplers at times which coincide with arrivals of said first plurality of intermediate signals;

(5) coupling a predetermined amount of energy from said second light signal into said output waveguide in each coupler such that a plurality of second intermediate signals is formed comprised of said first intermediate signals plus the coupled energy from said second signal;

(6) guiding said second intermediate signals to different ones of said fiber optic couplers;

(7) repeating steps 1-6 until all elements of an output vector have been formed in said output waveguide; and (8) detecting selected signals in said output waveguide.

10. A method of matrix-vector multiplication in an array of fiber optic couplers coupled to an output waveguide, comprising the steps of:

introducing a plurality of input light signals into a first fiber optic waveguide passing through said array of couplers in a first direction;

tuning a plurality of couplers in said array to couple a predetermined portion of power from an input light signal in said first fiber optic waveguide into said output waveguide;

guiding power coupled from the first fiber optic waveguide into said output waveguide such that said coupled power travels in a second direction in said output waveguide to another coupler in said array in time to be summed with additional power coupled into said output waveguide from a different input light signal, wherein said second direction is substantially opposite to said first direction.

11. A matrix-vector multiplier for multiplying elements of an input vector by coefficients of a matrix to generate the elements of an output vector comprising:

a plurality of fiber optic couplers having coupling operators representing said matrix coefficients;

a first fiber optic waveguide carrying input signals representing elements of said input vector in a first direction;

a second fiber optic waveguide optically coupled to said first fiber optic waveguide through said couplers, said second waveguide carrying output signals coupled by said couplers from said first waveguide, the output signals representing a product of the input signals multiplied by the coupling operators, said output signals travelling through said couplers in said first direction, and propagating through said multiplier in a second direction which is substantially opposite to said first direction.

12. A matrix-vector multiplier as defined in claim 11 wherein said second direction is such that energy representing an element of said input vector coupled into said second waveguide in a first coupler is fed back to a second coupler through which said energy representing an element of said input vector previously passed while travelling in said first waveguide.

13. A matrix-vector multiplier as defined in claim 12 wherein said second waveguide carries said coupled energy back to the coupler through which the element of said input vector passed most recently.

14. A matrix-vector multiplier as defined in claim 11 wherein said couplers are tunable such that individual coefficients of many matrices may be entered as represented by the coupling operators of said couplers.

15. A matrix-vector multiplier as defined in claim 11 wherein said first and second waveguides are monomode.

16. A method of matrix-vector multiplication for multiplying in an array of fiber optic couplers an input vector times a matrix to derive an output vector comprising the steps of:

introducing a signal representing an element of an input vector into a first waveguide and through a plurality of couplers tuned to couple into an output waveguide a selected amount of energy from said signal proportional to coefficients of said matrix; and collecting said coupled energy and summing it with coupled energy from another signal representing another vector element.

17. A filter for implementing a programmable transfer function comprising:

a first fiber optic waveguide for carrying an input signal;

a second fiber optic waveguide for carrying an output signal; and a plurality of tunable couplers for coupling a selectable amount of energy from said first waveguide into said second waveguide, said couplers tuned to cause desired characteristics of said transfer function, and said couplers and said fiber optic waveguides being configured to provide feedback recirculation between couplers, thereby influencing locations of peaks in said transfer function.

18. A filter as defined in claim 17 wherein said couplers are spaced along said first fiber optic waveguide by amounts selected to cause desired characteristics of said transfer function.

19. A filter as defined in claim 17 wherein said first and second fiber optic waveguides are monomode fiber.

20. A filter as defined in claim 17 wherein said second fiber optic waveguide is routed such that said recirculations occur between adjacent couplers.

21. A filter as defined in claim 17 wherein said couplers are comprised of:

first and second optical fibers mounted adjacent one another to form an interaction region, each of said fibers lying in a plane; and means for displacing said planes to adjust the coupling efficiency of said coupler.

22. A filter for implementing a programmable transfer function comprising:

a first monomode, fiber optic waveguide for carrying an input signal;

a second monomode, fiber optic waveguide for carrying an output signal;

an array of tunable fiber optic couplers arranged at selected locations along said first and second waveguides, each coupler for coupling selectable amounts of energy from said first waveguide to said second waveguide, wherein energy travelling in said first and second waveguides travels in the same direction through said couplers and wherein said second waveguide carries coupled energy back to other couplers so as to cause feedback recirculation between adjacent couplers, said couplers comprising first and second waveguides mounted adjacent one another to form an interaction region, each of said fibers lying in a plane; and means for displacing said planes to adjust the coupling operators of said coupler, said displacement selected and said couplers spaced along said first and second waveguides to tailor said transfer function to have desired characteristics.

23. A method of manufacturing a filter having an array of fiber optic tunable couplers for coupling power between input and output fiber optic waveguides comprising the steps of:

tuning said couplers and selecting a length of said waveguides between couplers to obtain a desired transfer function;

configuring said couplers and said waveguides such that feedback recirculation of signals occurs between couplers to obtain a desired location for peaks in said transfer function;

coupling a light source to said input waveguide for introducing an input signal into said input waveguide; and positioning a detector to receive light emerging from said output waveguide.

24. A method of matrix-vector multiplication in an array of fiber optic couplers coupled by a plurality of fiber optic waveguides comprising the steps of:

(1) introducing coefficients of a diagonal of said matrix into a coupler to establish a selected value for a coupling operator thereof such that each coupler is tuned to coefficients of a particular diagonal;

(2) introducing, into different couplers on a waveguide, signals representing elements of an input vector needed to compute all terms of a particular element of an output vector, said signals introduced at times selected so that a proper input signal encounters an appropriate coupler which is tuned to the coefficients of a proper diagonal to create one subelement of an element of said output vector;

(3) coupling through said appropriate coupler and into an output waveguide a portion of said input signal proportional to the matrix coefficients of said proper diagonal; and (4) summing the subelements of each output vector element in said output waveguide.

25. A method of matrix-vector multiplication in an array of tunable fiber optic couplers involving multiplying elements of an input vector by coefficients of a matrix to derive an output vector comprising the steps of:

timing introduction of input signals representing elements of said input vector onto the array of couplers so that a portion of a selected signal is coupled through a selected coupler at a desired time, wherein said couplers are tuned so that coupling coefficients of the couplers represent elements of said matrix, whereby said portion of a selected signal coupled through said selected coupler comprises an output signal defining a term of said output vector which represents the product of multiplication of the element of said input vector represented by said selected signal and the element of said matrix represented by the coupling coefficient of said selected coupler, and wherein said desired time is selected so that all said input signals encounter all said couplers to generate output signals representing all terms of elements of said output vector; and summing all said terms of the elements of the output vector to form all said elements of the output vector.

26. A method of matrix-vector multiplication in an array of fiber optic couplers coupled by a plurality of fiber optic waveguides comprising the steps of:

(1) introducing at different times signals representing coefficients of a diagonal of said matrix into a coupler to establish a selected value for a coupling operator thereof, such that each coupler is tuned to the coefficients of a particular diagonal;

(2) introducing into different said couplers on a waveguide input signals representing elements of an input vector needed to compute all terms of a particular element of an output vector, said input signals introduced at times selected so that a selected input signal intercepts a selected coupler defining a desired matrix coefficient for creating one subelement of an element of said output vector;

(3) coupling into an output waveguide a portion of said selected input signal which is proportional to the matrix coefficient; and (4) summing terms of each output vector element in said output waveguide.

27. A method of matrix-vector multiplication in an array of tunable fiber optic couplers involving multiplying the elements of an input vector by coefficients of a matrix to derive an output vector comprising the steps of:

timing introduction of signals representing elements of said input vector and tuning of said couplers in accordance with arrival of signals representing coefficients of said matrix such that all proper said elements eventually intercept all proper said coefficients to generate all terms of the elements of said output vector;

coupling during each said interception a selected amount of said input signal into an output waveguide to generate each said term; and summing all said terms to form all said elements of the output vector.

28. An optical signal processor comprising:

a first optical waveguide having a first end portion for receiving input optical signals and a second end portion, said first waveguide defining a first optical path for transmission of said input optical signals in a first direction from said first end portion to said second end portion;

a second optical waveguide having a first end portion for outputting output optical signals and a second end portion, said second waveguide defining a second optical path for transmission of optical signals in a second direction from said second end portion to said first end portion, said waveguides oriented such that said second direction is substantially opposite to the first direction;

a plurality of coupling means for optically coupling said input signals from said first waveguide to said second waveguide at discretely spaced intervals along said waveguides to provide said output signals, said coupling means locally orienting said first and second optical paths at said discrete intervals such that said input and output signals in said first and second optical paths travel in the same direction at said intervals, thereby causing the input optical signals propagating in said first direction in said first waveguide to be coupled from the first optical path into the second optical path so as to travel in said second direction in said second waveguide to provide said output signals;

a light source optically coupled to the first end portion of said optical waveguide for transmitting optical signals into the first optical path in said first direction; and means optically coupled to the first end portion of said second optical waveguide for detecting optical signals from the second optical path traveling in said second direction.

29. A signal processor as defined in claim 28 wherein first and second waveguide lengths between said coupling means are selected to cause signal processor to have a transfer function with selected characteristics.

30. A signal processor as defined in claim 28 wherein said coupling means are adjusted to couple an amount of energy between said first and second waveguides to cause a transfer function of the signal processor to have selected characteristics.

31. An apparatus as defined in claim 28 wherein said coupling means comprise:

means for mounting the first and second waveguides so that said waveguides converge and diverge to form an interaction region at adjacent planar faces of said first and second waveguides in which optical power is transferred between said waveguides; and means for precisely mutually displacing said first and second waveguides in a plane of said planar faces to adjust the coupling efficiency of said coupler.

32. An apparatus as defined in claim 28 wherein said first and second waveguides comprise first and second strands of fiber optic material having core portions, and wherein said coupling means comprise means for accurately positioning said strands together to form a region of interaction in which guided modes of light in the strands interact to cause light to be transferred between the core portions of the strands.

33. An apparatus as defined in claim 32 wherein the amount of power coupled between said fiber optic material is sensitive to displacement of said fiber optic material in a direction which laterally offsets said planar faces, while being comparatively insensitive to displacement in a direction which longitudinally offsets said faces.

34. An optical signal processor as defined in claim 28, wherein the light source transmits pulsed optical signals into the first optical path.

35. The optical signal processor as defined by claim 28 wherein each of said coupling means comprises a directional coupler having two input ports and two output ports.

36. The optical signal processor as defined by claim 35 wherein the optical coupling of said directional couplers is limited by a selected amount, whereby said processor functions as a systolic array.

37. The optical signal processor as defined by claim 36 wherein the optical waves in said waveguide are temporally incoherent and said systolic array functions as a matrix-vector multiplier.

38. The optical signal processor as defined in claim 35 wherein the directional coupler is a passive directional coupler, having a selected coupling ratio.

39. The optical signal processor as defined by claim 28 wherein said plurality of coupling means comprises an integrated optic coupler.

40. The optical signal processor as defined by claim 28 wherein said first and second optical waveguides each comprise optical fibers.

41. The optical signal processor as defined by claim 40 wherein said first and second optical fibers are helically shaped.

42. The optical signal processor as defined by claim 40 wherein said first and second optical fibers are single mode.

43. An optical signal processor for performing matrix-vector multiplication comprising:
   a first optical waveguide defining a first optical path;
   a light source optically coupled to the first optical waveguide for transmittting optical signals into the first optical path in a first direction of propagation;
   a second optical waveguide defining a second optical path;
   a plurality of coupling means which optically couple portions of the optical signals between the first and second optical paths, the coupling means being positioned such that the optical signals pass through the coupling means in a common direction, and such that signals coupled from the first optical path to the second optical path travel through said second optical path in a second direction of propagation which is substantially opposite to the first direction of propagation; and
   means optically coupled to the second waveguide for detecting optical signals transmitted from the second optical path in said second direction of propagation.

44. The optical signal processor as defined in claim 43 wherein each of the coupling means comprises a passive directional coupler having two input ports and two output ports, and having a selected coupling ratio.

45. An optical signal processor as defined in claim 43, wherein the light source transmits pulsed optical signals into the first optical path.

46. An optical signal processor as defined in claim 43 wherein the first and second optical waveguides each comprise single mode optical fibers.

47. An optical signal processor for performing matrix-vector multiplication comprising:
   a first optical waveguide defining a first optical path for transmission of input optical signals, said input optical signals having an intensity representing elements of a vector;
   a second optical waveguide defining a second optical path for transmission of output optical signals; and
   a plurality of coupling means optically coupling the first and second optical paths at spaced intervals for coupling the input signals from the first waveguide in accordance with predetermined coupling coefficients to form said output optical signals in said second waveguide, said plurality of coupling means including means for processing said input signals to cause the output signals to have an intensity representing a matrix-vector product of said vector elements and said coupling coefficients.

48. A signal processor as defined in claim 47 wherein said first and second coupling means are adjusted such that each couples a different amount of energy between said waveguides passing therethrough.

49. The optical signal processor as defined in claim 47 wherein each of the coupling means comprises a passive directional coupler having two input ports and two output ports, and wherein the processing means are defined by the proximity of cores of the first and second optical waveguides in the couplers.

50. An optical signal processor as definined in claim 47, further comprising a light source optically coupled to the first optical waveguide for transmitting pulsed optical signals into the first optical path in said first direction.

51. An optical signal processor as defined in claim 50 further comprising means for regulating timing of pulse transmission such that pulsed optical signals traveling in the second optical path interfere with other pulsed signals as said other pulsed signals are optically coupled from said coupling means into said second optical path.

52. An optical signal processor as defined in claim 47, wherein said coupling means secure said first and second waveguides in a configuration such that optical signals in said first and second optical paths travel in a common direction through said coupling means and such that backward optical coupling is provided whereby optical signals coupled from the first optical path to the second optical path propagate in said second optical path through the optical signal processor in a direction which is substantially opposite to said optical signal's direction of propagation in said first optical path.

53. An optical signal processor as defined in claim 47 wherein the first and second optical waveguides each comprise single mode optical fibers.

54. A method for processing optical signals comprising the steps of:
   providing a first optical fiber;
   connecting a plurality of optical couplers to the first optical fiber, said plurality of optical couplers representing an N by N matrix, and each of the plurality of optical couplers having a coupling ratio which represents an element of the N by N matrix;
   connecting a second optical fiber to the plurality of optical couplers, said second optical fiber having an output end;
   introducing a sequence of optical pulse signals into the first optical fiber, each of said optical pulse signals being representative of a component of a vector;
   coupling portions of the optical pulse signals from the first optical fiber through the plurality of optical couplers into the second optical fiber thereby providing in said second optical fiber a sequence of output pulses representing elements of a product of multiplication of the N by N matrix and the vector; and
   propagating the output pulses in the second optical fiber to the output end of said second optical fiber.

55. A method for processing optical signals according to claim 54 further comprising the step of optically coupling the second optical fiber to the plurality of optical couplers in a configuration which provides backward coupling between said first and second optical fibers.

* * * * *